(12) United States Patent
Whittenberger et al.

(10) Patent No.: US 7,906,079 B2
(45) Date of Patent: Mar. 15, 2011

(54) STACKABLE STRUCTURAL REACTOR

(75) Inventors: William A. Whittenberger, Leavittsburg, OH (US); David A. Becker, Hiram, OH (US); Randall J. Bartos, Ravenna, OH (US)

(73) Assignee: Catacel Corp., Garrettsville, OH (US)

( * ) Notice: Subject to any disclaimer, the term of this patent is extended or adjusted under 35 U.S.C. 154(b) by 529 days.

(21) Appl. No.: 11/956,000

(22) Filed: Dec. 13, 2007

(65) Prior Publication Data

US 2008/0145284 A1    Jun. 19, 2008

Related U.S. Application Data

(60) Provisional application No. 60/874,901, filed on Dec. 14, 2006.

(51) Int. Cl.
*B01D 50/00* (2006.01)
*B01D 53/34* (2006.01)
(52) U.S. Cl. ............... 422/181; 422/180; 422/222
(58) Field of Classification Search ........... 422/190, 422/180, 222, 181, 192
See application file for complete search history.

(56) References Cited

U.S. PATENT DOCUMENTS

| | | | |
|---|---|---|---|
| 4,993,223 A * | 2/1991 | Kretzinger | 60/39.511 |
| 5,139,844 A * | 8/1992 | Maus et al. | 428/116 |
| 7,501,102 B2 * | 3/2009 | Whittenberger et al. | 422/205 |
| 7,566,487 B2 * | 7/2009 | Feinstein | 428/116 |
| 7,682,580 B2 * | 3/2010 | Whittenberger et al. | 422/222 |
| 2003/0086845 A1 * | 5/2003 | Adusei et al. | 422/222 |
| 2004/0206486 A1 | 10/2004 | Whittenberger | |
| 2005/0183405 A1 | 8/2005 | Gillingham et al. | |
| 2005/0217836 A1 | 10/2005 | Whittenberger et al. | |
| 2006/0008399 A1 | 1/2006 | Feinstein | |
| 2006/0008414 A1 | 1/2006 | Retallick et al. | |
| 2006/0019827 A1 | 1/2006 | Whittenberger | |
| 2006/0228598 A1 | 10/2006 | Venkataraman et al. | |
| 2006/0230613 A1 | 10/2006 | Whittenberger et al. | |
| 2006/0245981 A1 | 11/2006 | Whittenberger et al. | |
| 2006/0245982 A1 | 11/2006 | Whittenberger et al. | |
| 2006/0263278 A1 | 11/2006 | Whittenberger et al. | |
| 2007/0025893 A1 | 2/2007 | Whittenberger et al. | |

FOREIGN PATENT DOCUMENTS

| | | |
|---|---|---|
| JP | 2004-073924 A | 3/2004 |
| JP | 2006-000798 A | 1/2006 |

* cited by examiner

*Primary Examiner* — N. Bhat
(74) *Attorney, Agent, or Firm* — Pearne & Gordon LLP

(57) ABSTRACT

A reactor including a monolith having a plurality of fins in an annular arrangement for receiving fluid flow through the reactor. The monolith is disposed within a generally cylindrical outer tube, and around a corrugated inner tube. The reactor includes a device for urging the monolith radially outward, so as to maintain contact between the monolith and the outer tube.

21 Claims, 16 Drawing Sheets

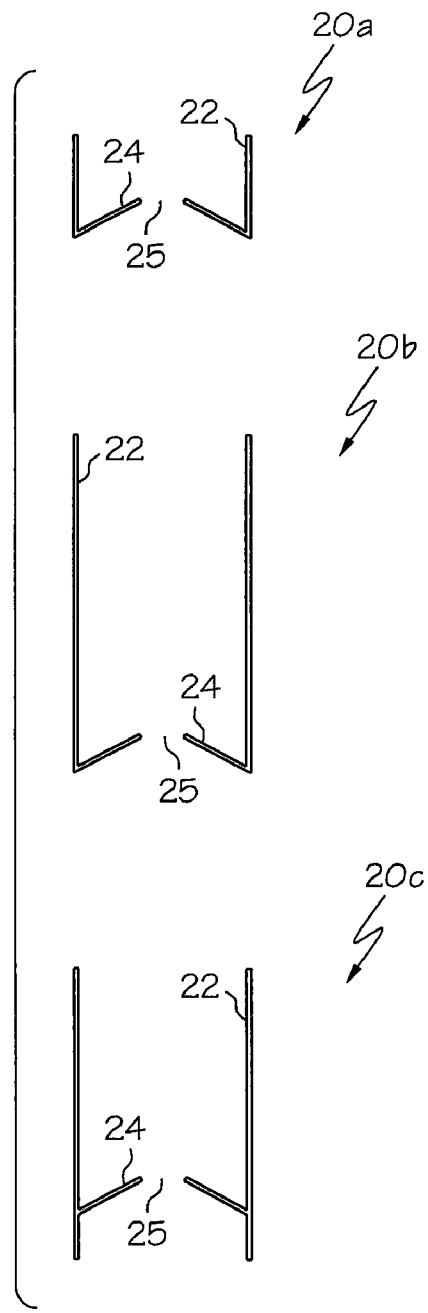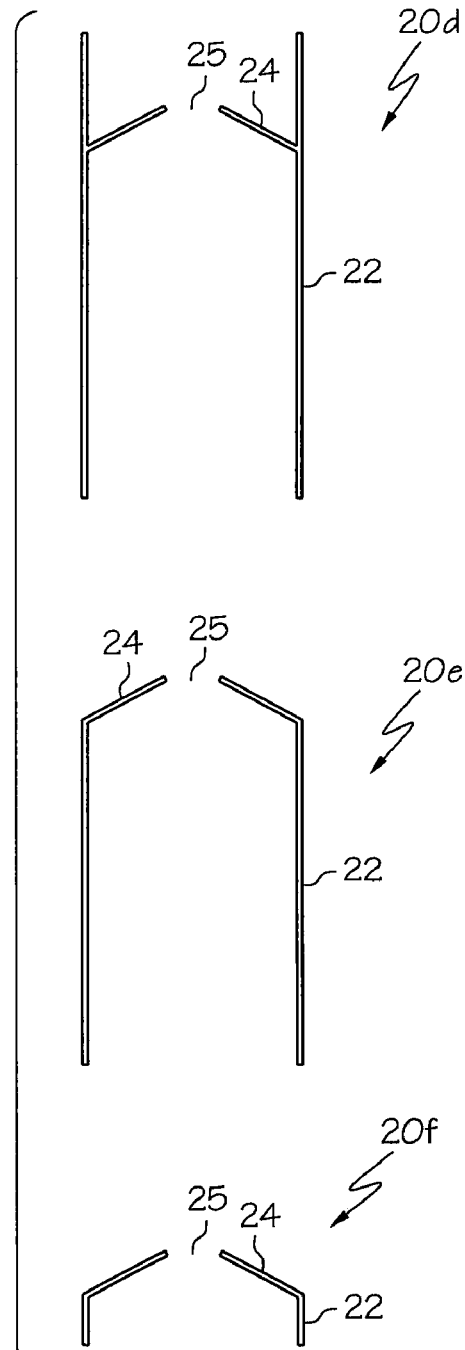
FIG. 7
FIG. 8

STACKABLE STRUCTURAL REACTOR

CROSS-REFERENCE TO RELATED APPLICATIONS

This application claims the benefit of U.S. Provisional Patent Application Ser. No. 60/874,901 filed Dec. 14, 2006, the contents of which are incorporated herein by reference in their entirety.

BACKGROUND OF THE INVENTION

This invention relates to the field of surface catalytic reactions and/or heat exchange. The present invention provides a reactor (sometimes referred to as Stackable Structural Reactor or SSR) which fits within a cylindrical tube, and which effectively transfers heat from the tube to the interior of the reactor, or from the interior of the reactor to the tube.

The reactor and improvements thereof of the present invention achieve similar objectives as those of the catalyst supports described in U.S. Pat. App. Pub. Nos. 2007/0025893, 2006/0263278, 2006/0245982, 2006/0245981, 2006/0230613, 2006/0228598, 2006/0019827 and 2006/0008414 and U.S. Pat. Nos. 7,150,099 and 6,920,920, the contents of which are incorporated herein by reference in their entirety.

The reactors shown in the above-cited applications, and others reactors of the prior art, generally occupy substantially all of the space within a cylindrical outer tube. An inherent problem with reactors of this kind is that they do not perform particularly well near the center of the reactor. It has been found that most of the catalytic reactions occur near the outer portions of the reactor, i.e. near the outer tube where heat exchange is more readily available. This problem reduces the capacity of the reactor, effectively limiting the throughput that can be accommodated at the desired level of conversion.

The present invention provides a reactor structure which solves the above problem. The reactor of the present invention will accommodate substantially more throughput than reactors of similar size of the prior art.

Another problem encountered with reactors installed in cylindrical tubes is that of metallic creep and thermal expansion. The reactors described in the above-cited applications, as well as the reactor of the present invention, are intended to be inserted into metallic tubes and sometimes operated at high temperatures (in the range of 850-900° C.) and high pressures (in the range of 20-30 bar). The pressure creates a large hoop stress, which the tube material has difficulty resisting at the high temperature. Over a period of years, creep in the metal outer tube causes the diameter of the tube to grow. Even a few millimeters of growth in the tube diameter creates an undesirable gap between the reactor and the surrounding tube. A typical reactor which has been inserted into a new tube, such that the reactor is initially in good contact with the tube, will lose contact with the tube when the tube creeps over the years. Such creep will cause a significant drop in performance.

The present invention provides structure which avoids the above problem. The invention includes a device that continuously compensates for creep, insuring proper contact between the reactor and the surrounding outer tube.

The reactor of the present invention can be used wherever ceramic packed beds have been traditionally used, for example, in the field of catalytic fuel reforming, to make hydrogen, which is then used in generating electricity through a fuel cell, or in other industrial processes such as oil and gas refining, ammonia and fertilizer production, hydrogenation of oils and chemicals, and iron ore reduction. The reactor could be used as a catalytic or non-catalytic combustor, as a water-gas shift reactor, as a Fischer-Tropsch reactor, or as a simple heat exchanger.

SUMMARY OF THE INVENTION

In one embodiment, a reactor of the present invention can comprise a monolith comprising a plurality of fins in an annular arrangement such that the fins define flow paths or channels for receiving and/or guiding or carrying fluid flow through the reactor. The monolith of the reactor has an outer annular surface forming an outer annular diameter and an inner annular surface forming an inner annular diameter, said inner annular surface defining a center section of the reactor. The monolith further comprises at least one cut along an annular surface thereof, for example, the outer annular surface, inner annular surface, or combination thereof. The at least one cut forms an open channel extending around a portion of an annular surface of the monolith. The reactor is positioned in an outer tube adjacent the outer annular surface of the monolith.

In another embodiment, a reactor of the present invention can comprise a series of monoliths stacked together, each monolith of the series comprising a plurality of fins in an annular arrangement such that the fins define substantially vertical flow channels for receiving fluid flow through the reactor. Each monolith of the series has an outer annular surface forming an outer annular diameter and an inner annular surface forming an inner annular diameter, said inner annular surface defining a center section of the reactor. Adjacent the inner annular surface of the series of monoliths, a series of bladders, such as a top bladder, middle bladder and/or bottom bladder, is stacked together. The series of bladders form a boundary between the series of monoliths and the center section of the reactor. The reactor is positioned in an outer tube adjacent the outer annular surface of the monolith.

In another embodiment, a reactor of the present invention can be designed for use in a down flow system. The reactor can comprise a monolith having a length measured from the top surface of the monolith to the bottom surface of the monolith. The monolith comprises a plurality of fins in an annular arrangement such that the fins define flow channels for receiving fluid flow through the reactor. The reactor can have an inner tube adjacent the inner annular surface of the monolith and a cone washer adjacent the inner tube. The cone washer forms an elbow joint with the inner tube as described herein. The elbow joint is preferably located greater than 50 percent of the monolith length from the top surface of the monolith.

In another embodiment, a reactor of the present invention can be designed for use in an up flow system. The reactor can comprise a monolith having a length measured from the top surface of the monolith to the bottom surface of the monolith. The monolith comprises a plurality of fins in an annular arrangement such that the fins define flow channels for receiving fluid flow through the reactor. The reactor can have an inner tube adjacent the inner annular surface of the monolith and a cone washer adjacent the inner tube. The cone washer forms an elbow joint with the inner tube as described herein. The elbow joint is preferably located greater than 60 percent of the monolith length from the bottom surface of the monolith.

In another embodiment, a reactor of the present invention can comprise a plurality of fins in an annular arrangement such that the fins define flow channels for receiving fluid flow through the reactor. The annular arrangement of fins creates a monolith that is expandable in a radial direction. The monolith further has an outer annular surface forming an outer annular diameter and an inner annular surface forming an inner annular diameter, said inner annular diameter defining a center section of the reactor. An expandable corrugated inner tube is positioned adjacent the inner annular surface of the monolith and an expandable cone washer adjacent or inside the inner tube. The cone washer and inner tube form a substantially leak proof boundary between the monolith and center section of the reactor. The boundary forces substantially all fluid flow through the reactor through the monolith and thus away from the center section.

In another embodiment, a method for installing a reactor of the present invention is provided. The method comprises a) providing an outer tube having an inner diameter for encasing a reactor; b) providing a monolith comprising a plurality of fins in an annular arrangement such that the fins define flow channels for receiving fluid flow through the reactor and the monolith has an outer annular surface forming an outer annular diameter and an inner annular surface forming an inner annular diameter; c) compressing the monolith with a compressing means such that the outer annular diameter of the monolith is less than the inner diameter of the outer tube and the monolith has an uncompressed outer annular diameter greater than the inner diameter of the outer tube; d) inserting the compressed monolith in the outer tube; and e) releasing the compressing means to allow the monolith to expand into an uncompressed position such that the outer annular surface of the monolith is in contact with the outer tube.

The reader skilled in the art will recognize other objects and advantages of the invention, from a reading of the following brief description of the drawings, the detailed description of the invention, and the appended claims.

BRIEF DESCRIPTION OF THE DRAWINGS

FIG. 7 provides a cross-sectional view of three bladders shapes, a top, middle and bottom shape, in an orientation for accommodating a down flow system in accordance with an aspect of the present invention.

FIG. 8 provides a cross-sectional view of three bladders shapes, a top, middle and bottom shape, in an orientation for accommodating an up flow system in accordance with an aspect of the present invention.

FIG. 14$b$ provides an angled top perspective view of one piece of a two-piece bushing in accordance with an aspect of the present invention.

DETAILED DESCRIPTION OF THE PREFERRED EMBODIMENTS OF THE INVENTION

The reactor of the present invention, sometimes referred to as a stackable structural reactor ("SSR"), comprises a catalyst or reaction support, preferably made of metal foil, the metal foil comprising a plurality of leaves or fins which define a relatively large surface area for catalytic reaction and/or heat exchange. In a preferred embodiment, the fins are formed by folding metal foil back and forth upon itself to define a monolith. The terms "leaves" and "fins" are used interchangeably in this specification. If the monolith is used for catalytic reactions, its surfaces can be coated with a suitable catalyst. The fins can be formed around a center support such as a central mandrel, pipe, post, link piece or other structure in an annular arrangement in order to form a monolith of general annular cross section, as viewed in the direction of the flow of fluid through the reactor. The monolith and central structure can be inserted within a cylindrical tube or outer tube 7, such as a reformer tube, that encloses the reactor. The outer tube 7 effectively transfers heat from the exterior of the tube to the interior of the reactor, or from the interior of the reactor to the cylindrical tube. The other side of the reactor can be bound by an expandable inner tube 10, such as a backing, that can be corrugated. Alternatively, the backing can be flat segments shingled one on another. The reactor occupies the space that is generally adjacent the inner surface of the outer tube 7, without occupying the space near the central axis of the outer tube. The advantage of this annular structure is that the fins of the reactor are all located in a region that is closest to the outer tube 7. Heat from outside the outer tube 7 is transferred easily to the annulus. The inner tube 10 prevents gas entering the reactor from flowing into the central region of the structure.

Figure 1:
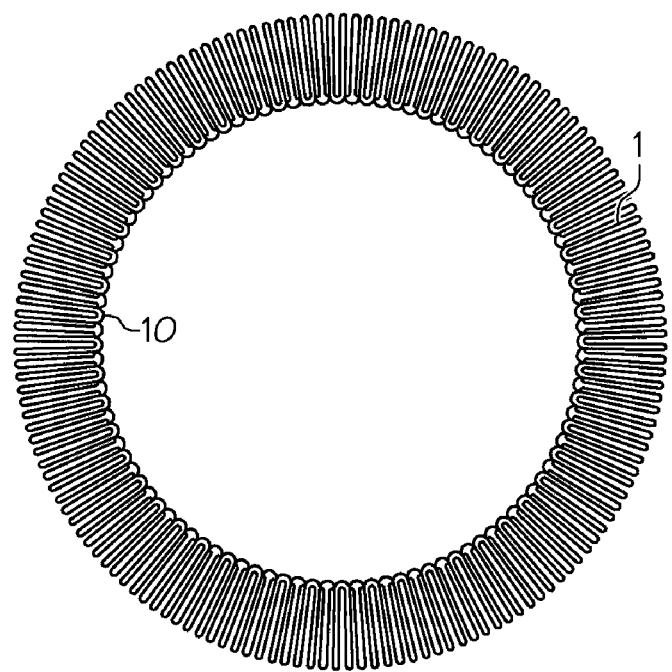
FIG. 1 provides an end view of an annular monolith and its associated inner tube in accordance with an aspect of the present invention.

Various modifications and embodiments of the reactor and associated reactor components will now be described. The basic structure of the reactor of the present invention is shown in FIG. 1. The monolith 1 has an inner annular surface having an inner annular diameter and outer annular surface having an outer annular diameter. As shown, the annular monolith 1 can be formed of a strip of metal or steel foil that has been folded back and forth upon itself. The folds of the foil create fins or leaves, and comprise the means for heat exchange. A folded foil is commercially available from Robinson Fin Machines, Inc. of Kenton, Ohio. The density of the fins in the monolith can vary depending on the number of folds and desired number of fins. The fin density of the monolith 1 is preferably greater than 1, more preferably 5, more preferable 10, more preferably 15, more preferably 20, more preferably 25, more preferably 30 or about 28 fins per inch of length as measured along the inner annular diameter of a monolith.

Figure 2:
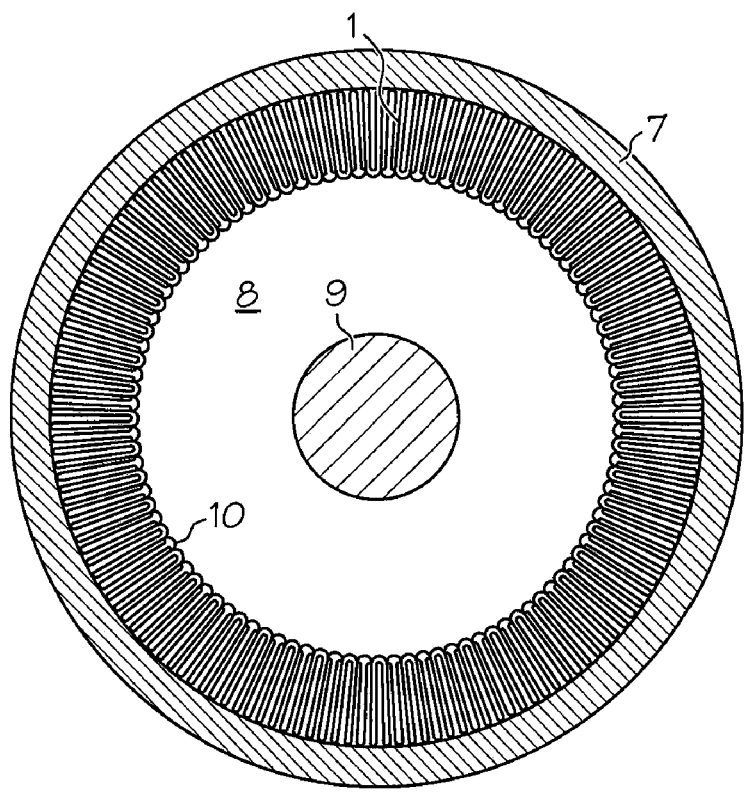
FIG. 2 provides a cross-sectional view of a reactor installed within an outer tube in accordance with an aspect of the present invention.

The fins shown in FIG. 1 form flat vertical fluid flow channels for receiving fluid flow through the reactor. Alternatively, the fins can have a wavy, ruffled or any similar shape that increases the surface area of the monolith exposed to fluid flow (not shown in FIG. 1) and also increases turbulence and therefore heat transfer. The monolith can be bound along its inner annular surface, such as by welding, with an expandable inner tube 10, such as corrugated backing. The backing 10 can have a corrugated surface and can be composed of a high strength alloy such as Haynes 230, or of substantially the same material as the monolith 1. FIG. 2 shows the monolith 1 encased within an outer tube 7, such as a metal pipe or reformer tube, and a center support 9 located at the central axis of the monolith 1. In this arrangement, the monolith 1 surrounds the center support 9 and forms an open gap 8 between the monolith 1 and center support 9. The monolith 1 generally expands and/or contracts in the radial direction. Thus, the gap 8 provides space that can be used to house components for assisting in the expansion or contraction of the monolith 1 or in the installation or removal of the monolith from an outer tube 7, as will be explained below.

In order to improve fluid flow properties or turbulence in the reactor, modifications such as cuts 5 can be made to a monolith 1, for example, in the outer or inner annular surface. A cut 5 forms an open channel for receiving fluid flow and extends around a portion of a surface of a monolith 1. As used herein, improved fluid flow generally refers to enhanced mixing of fluid in the reactor and/or increased heat transfer, such as that between the monolith 1 and outer tube 7. The various cuts 5 discussed below can be made in a conventional manner, such as by sawing through a portion of a monolith 1 with an abrasive rotary saw blade or by using a high-pressure water jet cutting apparatus.

Figure 3:
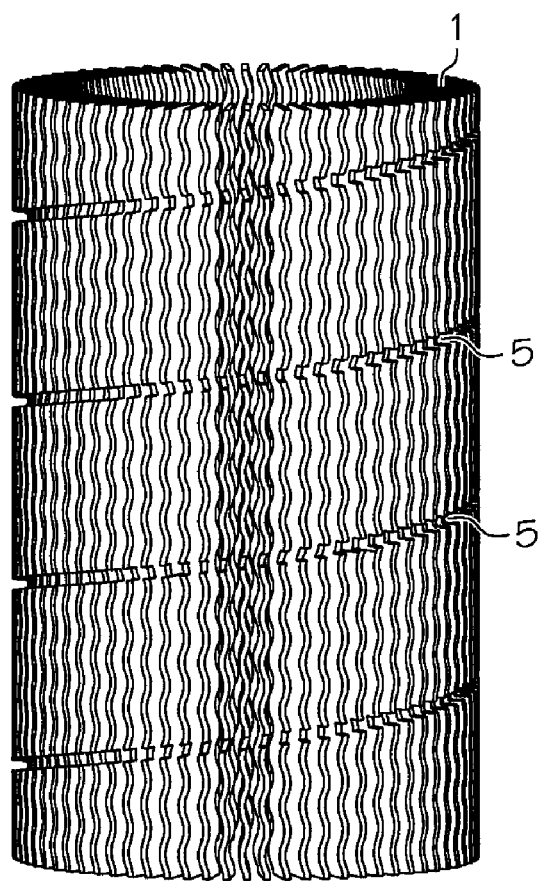
FIG. 3 provides a side perspective view of a monolith having a corkscrew cut in accordance with an aspect of the present invention.
Figure 4:
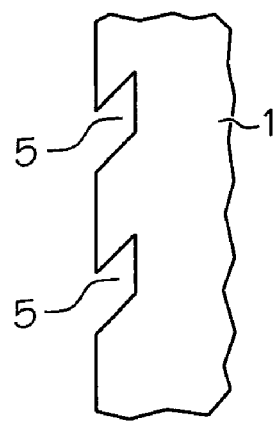
FIG. 4 provides a cross-sectional view of a fin of a monolith in accordance with an aspect of the present invention.

FIG. 3 shows a monolith 1 having a continuous angular cut 5 located on its outer annular surface. As shown, the continuous angular cut 5 forms an open corkscrew path or channel around the outer annular surface of the monolith 1 that begins near the top of the monolith 1 and curves around at a specified angle until the cut 5 reaches the bottom of the monolith 1. The angle of the cut 5, as measured from the horizontal 12 (i.e. perpendicular with the fluid flow through the reactor), is preferably in the range of about 5 to 30 degrees, preferably 10 to 25 degrees, preferably 10 to 20 degrees or about 15 degrees. A cut 5 can have any shape, for example, a square, rectangular, curved or ditch-like opening in a monolith 1. FIG. 3 shows a general square or box-like continuous angular cut 5 in a monolith 1. The angular cut 5 also can be made at both an angle to the horizontal 12 to form a corkscrew pattern and at an angle relative to the horizontal 12 such that the opening formed by the cut 5 is tilted upward or downward in relationship to the flow direction of fluid in the reactor. For example, FIG. 4 shows a cross-sectional view of a monolith 1 having an angular cut 5 on its outer annular surface. An angular cut, as shown in FIG. 3, can be in the shape of a screw thread having a left-hand or right-hand thread or cut rotation. Although not shown, a cut 5 or plurality of cuts 5 can be tilted upward or downward at any angle relative to the direction of fluid flow.

As fluid in the reactor is interrupted by a cut 5, the fluid tends to follow the path formed by the cut 5. For example, fluid may follow the corkscrew path of an angular cut 5 and flow sideways into adjacent channels formed by the fins of the monolith 1. Such a flow pattern allows for enhanced mixing of fluid around the outer circumference of the monolith 1 and promotes uniform heating of the monolith 1. In the event multiple reactors are stacked together, one on top of another, cuts 5 can be aligned such that the start of a cut 5 at the top of one monolith 1 can be in register with the ending of a cut 5 at the bottom of a monolith 1 stacked on top of the former monolith 1. Aligning cuts 5 in multiple monoliths 1 allows the fluid flowing through the multiple reactors to continuously flow around the circumference of each monolith 1 without being significantly diverted at each monolith end before the fluid enters the next monolith 1 stacked below or above, depending whether fluid flow is in an up flow or down flow direction.

In another embodiment, cuts 5 in a monolith 1 can be arranged as a plurality of cuts 5 equally spaced apart at a select distance to form an angled, striped pattern on the outer annular surface of the monolith 1. The striped pattern can have a left-hand or right-hand threaded arrangement. The cuts 5 can be angled relative to vertical fluid flow direction, for example at 15 degrees. The number of cuts 5 can be varied depending on the desired fluid flow pattern, degree of fluid mixing or heat transfer in the reactor. As similarly described above, a plurality of angled cuts 5 can be aligned with cuts 5 in a separate monolith 1 that may be stacked on top or below to create an uninterrupted flow of fluid through the reactor or string of stacked reactors.

In another embodiment, a cut 5 or plurality of cuts 5 can be substantially perpendicular to the direction of fluid flow (i.e. a horizontal cut). In this arrangement, a cut 5 forms a ringed-channel around a monolith 1. The horizontal cut 5 can be located any where along the length of the monolith 1 and on the outer annular surface or inner annular surface. A horizontal cut 5 or plurality of horizontal cuts 5 can be used in the case the reactor is uniformly heated by the outer tube 7.

In another embodiment, a monolith 1 can have cuts 5 on its inner annular surface to form an open channel around a portion of the inner annular surface. The monolith 1 can have cuts 5 on the inner annular surface (i.e. inner cuts), outer annular surface (i.e. outer cuts) or a combination thereof. The inner cuts 5 are preferably adjacent to a center support 9 or other components, such as a cone washer 13 or an inner tube 10, located between a center support 9 and a monolith 1. In the case that an inner tube 10 is secured or bound or simply adjacent to a monolith 1, the inner cuts 5 would be in direct contact with the inner tube 10. The inner cuts 5 can be straight (i.e. at a 90° angle to the vertical fins) or angled to form a corkscrew pattern and/or angled relative to the horizontal 12 such that the opening created by the cut 5 can be tilted upward or downward at any angle to the flow direction of fluid in the reactor as discussed above. For example, the inner cut might be a 0.2-inch deep by 0.1-inch wide straight cut on the inner surface of the monolith.

Figure 5:
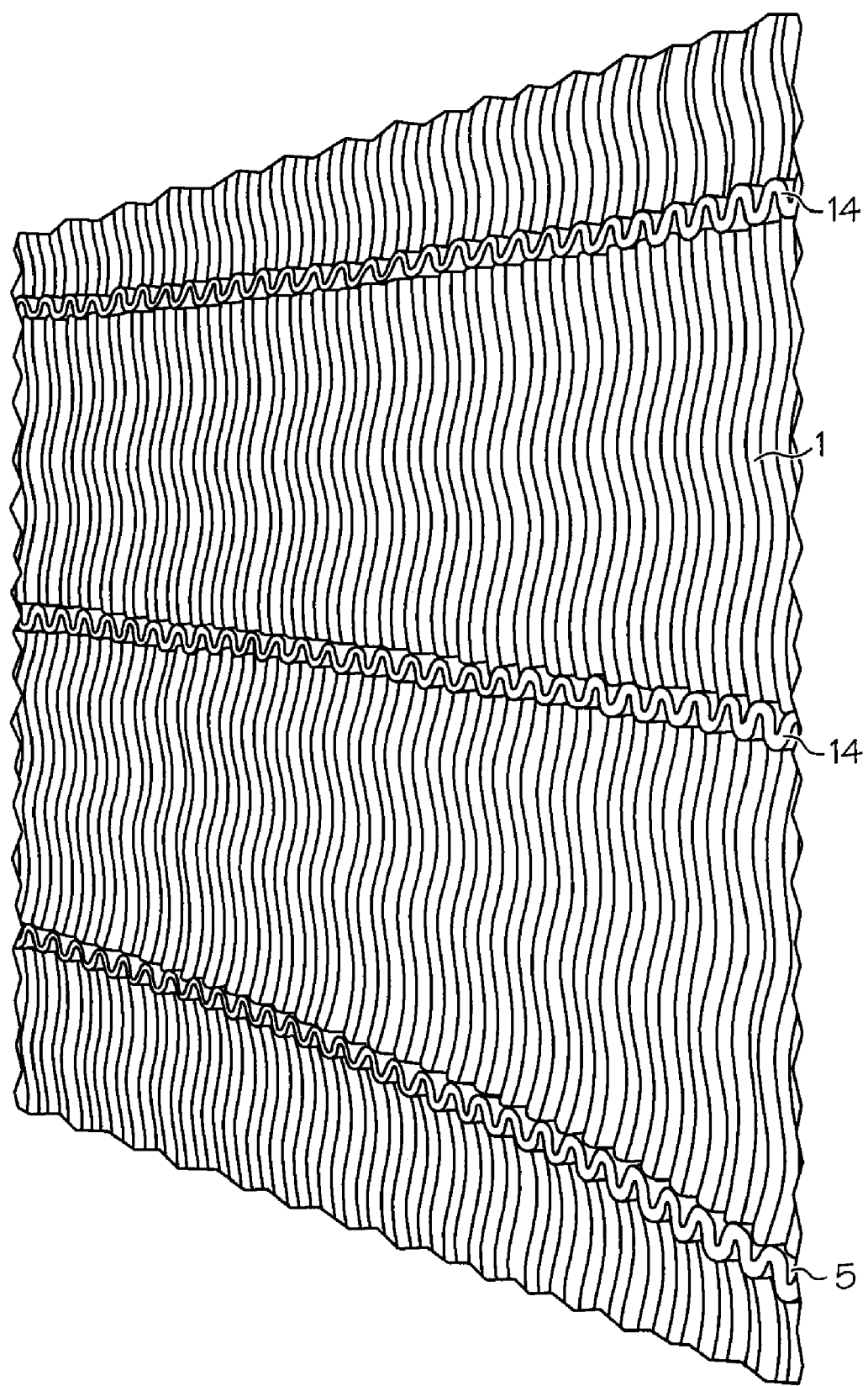
FIG. 5 provides a view of the inner annulus surface of a monolith having inner horizontal cuts with flow diverters inserted within the cuts in accordance with an aspect of the present invention.

In one embodiment, a flow interrupter or flow diverter 14 can be inserted inside a cut 5 on an annular surface of a monolith 1. Preferably, the diverter 14 is not attached to the surface of the cut 5. Alternatively, the flow diverter 14 can be attached, for example by welding, to an inner cut 5 on the inner surface of a monolith 1. The flow diverter 14 can be a corrugated strip of metal foil, preferably formed in a ring shape that corresponds to the shape of a cut 5. For example, the flow diverter 14 can be a 3/16-inch strip of corrugated metal foil. Preferably, the flow diverter 14 is made of metal or substantially the same material as that of the monolith 1. FIG. 5 shows a flow diverter 14 inside an inner cut 5 in a monolith 1. As shown, the flow diverter 14 occupies substantially all of the inner cut 5 space such that the only open areas in the inner cut 5 are formed by the corrugations of the flow diverter 14. The fluid flow pattern through the monolith 1 can be altered as desired by positioning one or multiple flow diverters 14 along the inside of a monolith 1. For example, a monolith 1 might include one flow diverter 14 located in an inner cut 5 for each inch of monolith 1 length, as measured in the direction of fluid flow. Alternatively, any other flow diverter 14 spacing can be used in order to adjust fluid flow as desired. In another embodiment, one or multiple flow diverters 14 can be inserted into outer cuts 5 on the outer surface of a monolith 1. Thus, flow diverters 14 can be located near the outer annular surface and inner annular surface or just at the inner annular surface or outer annular surface of a monolith 1.

As discussed above, the monolith 1 can have cuts 5 or modifications, such as a flow diverter 14, for modifying the flow pattern of fluids through the reactor. The cuts 5 can be inner cuts 5, without or without flow diverters 14, outer cuts 5, with or without flow diverters 14, or any combination thereof. For instance, a monolith 1 can have outer cuts 5 in the shape of curved ditches and at least one inner square-shaped cut 5 with a flow diverter 14 attached therein. The flow diverter 14 can be corrugated such that the peaks of the corrugations are aligned with the channels formed by the fins in a monolith 1. Thus, the peaks of the corrugations of the flow diverter 14 can rest or be positioned in the channels to secure the flow diverter 14 to a monolith 1.

Figure 6:
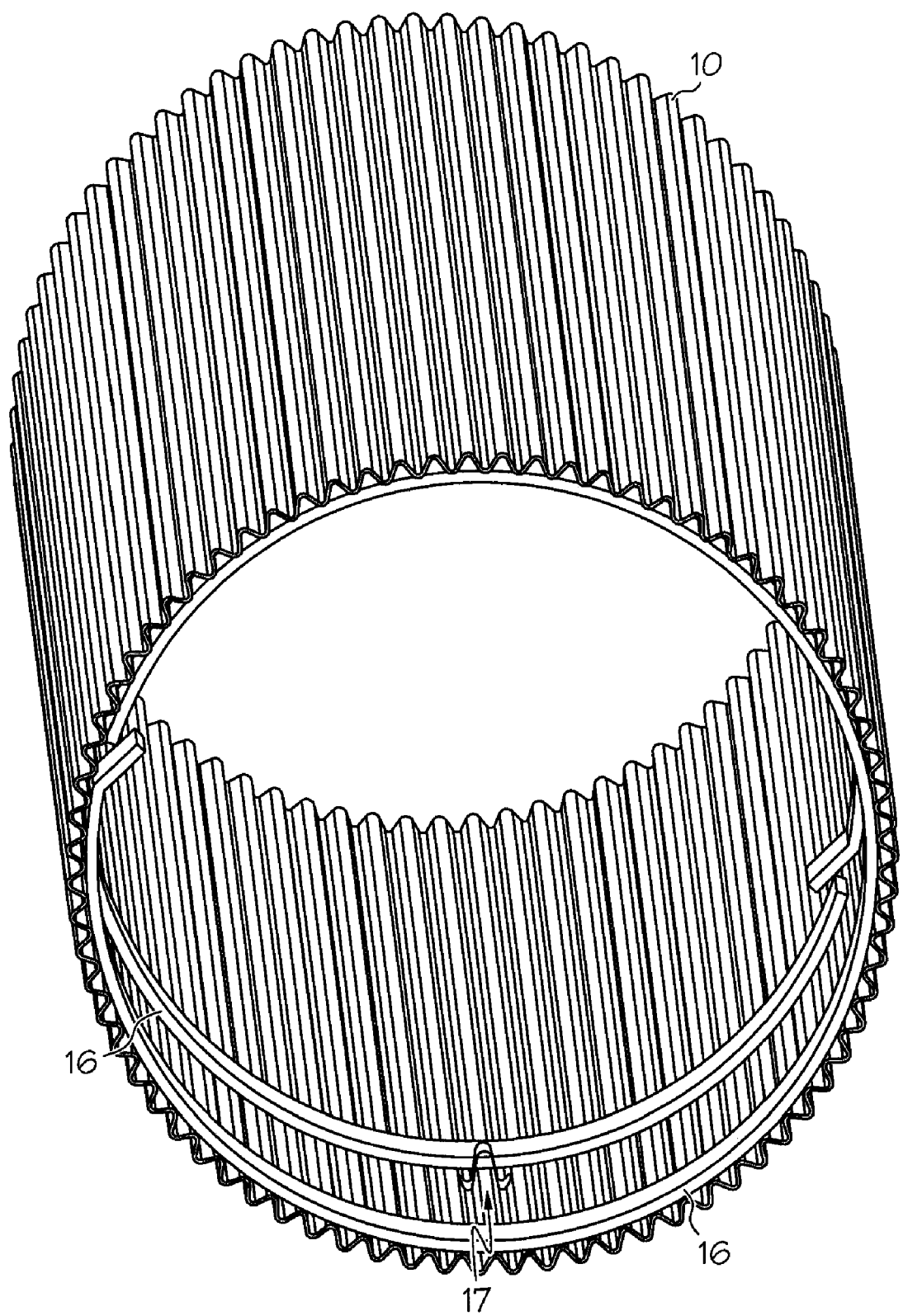
FIG. 6 provides an end perspective view of an inner tube having expansion springs positioned at selected regions inside the tube in accordance with an aspect of the present invention.

Turning to FIG. 6, an inner tube 10 can be positioned near or adjacent the inner annular surface of a monolith 1. Preferably, the inner tube 10 as shown is not attached to the inner annular surface of a monolith 1. Alternatively, the inner tube 10, such as backing formed from corrugated foil, can be attached to a monolith 1, preferably by welding, such as tack welding. The corrugated backing can be made with occasional flat zones to facilitate such tack welding. For instance, a corrugated, metal foil tube 10 can be tack welded to the inner surface of a monolith 1. The peaks of the corrugations of the backing foil 10 can be aligned with the fin peaks of a monolith 1. Alternatively, an inner tube 10 can be made from segments of flat metal foil layered and joined at specific locations to the fins so that the tube 10 can expand and contract in the radial direction. Flat foil can provide an accessible surface for welding the backing 10 to the inner surface of a monolith 1.

A corrugated inner tube 10 can generally expand or contract in a radial direction and be flexible as described with regard to a monolith 1. Thus, an inner tube 10 can be fit to rest against the inner annular surface of a monolith 1 so that attaching the tube 10 to a monolith 1 is not required. In its free position, a monolith 1 will generally collapse towards its center. An inner tube 10 placed at the center area of a monolith 1 can be held into place by the collapsing forces 1 without the need for welding. The inner tube 10 and monolith 1 can expand and contract together as a system of concentric tube or annuluses in direct contact with one another. In this concentric arrangement, the inner tube 10 can form a substantially leak-proof boundary between the center section of the reactor and the monolith receiving fluid flow. Although not shown, the inner tube 10 can have a vent for permitting fluid flowing through the monolith 1 to enter and inflate the center section of the reactor. The fluid from monolith 1 creates pressure in the center section of the reactor and expands the corrugated inner tube 10 during reactor operation to ensure the monolith 1 is pressed against the outer tube 7. After inflation, there is intended to be no additional flow through the vent.

In another embodiment, bladders 20 or modified inner tube sections can be formed and positioned inside a monolith 1 or series of monoliths 1 stringed together in a stacked fashion. A series of bladders 20 can be stacked together in order to create an inner tube 10 that corresponds to the height of a monolith 1 or series of monoliths 1. The series of bladders 20 can form a boundary between the center section of a reactor and a series of monoliths 1. The bladders 20 can be formed in various shapes depending on whether the reactor is arranged for an up flow or down fluid flow system. The bladders 20 may be formed in a top, middle and bottom shape, wherein the top, middle and bottom shapes vary for an up flow or down flow arrangement. The bladders 20 can be formed in a one-piece or two-piece design. FIG. 7 shows three cross-sectional views of one-piece bladder shapes 20a, 20b, 20c arranged in a stackable orientation for a down flow system, whereas FIG. 8 shows three bladders 20d, 20e, 20f oriented for an up flow system. The up flow orientation of bladders 20 comprises a top bladder 20d, middle bladder 20e and bottom bladder 20f. Similarly, the down flow orientation comprises a top bladder 20a, middle bladder 20b and bottom bladder 20c.

Each bladder 20 shown in FIG. 7 preferably comprises a circular tube 22 that can be formed from the materials as discussed above with regard to the inner tube 10, such as metal. For instance, a one-piece bladder 20 as shown can be made from metal foil. In another example, a two-piece bladder can be made of two pieces of metal foil welded or brazed together as conventional in the art. The two pieces can be a cone portion 24 and a circular tube potion 22. The bladders 20 can be formed from corrugated material such that they are expandable in a radial direction. If corrugated material is used, the corrugation peaks of the bladder 20 can match up and align with the fin peaks of a monolith 1 in order to create a substantially leak free boundary.

The bladders 20 can be stacked on top of one another, and preferably in the following arrangement (1) a top bladder 20a, 20c stacked on top of and in contact with a middle bladder 20b, 20d, (2) a middle bladder 20b, 20d stacked on top of an in contact with a bottom bladder 20c, 20f, and (3) a bottom bladder 20c, 20f positioned on the bottom cover or plate of an outer tube 7 encasing the reactor. Optionally, multiple middle bladders 20b, 20e can be stacked one on top of another wherein the string of middle bladders 20b, 20e is sandwiched between a top bladder 20a, 20d and a bottom bladder 20c, 20f. In the stacked position, the bladders 20 can be attached together such as by tack welding or using a sealant, adhesive or cement. Preferably, the attaching method used creates an air-tight seal such that the fluid flow does not leak through a monolith 1 section into the center section of a bladder 20. In order to inflate a bladder 20, a vent or series of vents (not shown) can be positioned in the wall of a bladder 20. The vents are normally positioned at the upstream end of a bladder 20, where pressure in the monolith is locally at a maximum, thus maximizing the pressure in the bladder 20 used for inflation. A vent might include, for example, a circular hole or series of holes in the circular tube portion 22 of a bladder 20. In a series of bladders, it is preferably that at least one bladder in the series has a vent for permitting fluid flow through the boundary between the center section of the reactor and the monolith 1. Fluid from the monolith 1 expands the circular tube portion 22 of the bladder 20 and pressurizes the center of the bladder 20. In a stacked arrangement, vents are preferably used to ensure that each bladder 20 is in an expanded position such that the circular tube portion 22 of a bladder 20 is in contact with the inner annular surface of a monolith 1. In a pressurized state, the bladder 20 can press against the inner annular surface of a monolith 1 and ensure the outer annular surface of the monolith 1 is in contact with an outer tube 7. In the case a bladder 20 has a cone portion 24 a vent can be placed directly above or below the cone portion 24 depending on flow direction.

As shown in FIGS. 7 and 8, the bladders 20 can have cone portions 24 pointed upward. A cone portion 24 extends inward from the wall of a bladder 20 towards the center section of a reactor and away from a monolith 1. A cone portion 24 of a bladder 20 resembles and functions similarly to a cone washer 13 as discussed herein. Similar to a cone washer 13, the cone portion 24 of a bladder 20 can have a center opening 25 for receiving a center support 9 or other linking assembly, such as a link piece 40 or cable. A center opening 25 can house a bushing 30 for securing a center support 9 or like structure to the cone portion 24. A cone portion 24 can be located at any position along the wall of the tube section 22 of a bladder 20. For instance, as shown in FIG. 7, a top bladder 20a can have a cone portion 24 located at its bottom edge, a middle bladder 20b can have a cone portion 24 located at its bottom edge and a bottom bladder 20c can have a cone portion 24 located near its middle or slightly below the middle of the bladder 20c.

The inner tube 10 or bladder 20 generally prevents a monolith 1 from collapsing or bending inward toward its center during installation and/or operation of the reactor. However, depending on the material, thickness and general structural integrity of the inner tube 10, additional support may be needed to ensure a monolith 1 remains expanded and in contact with the outer tube 7 that encases the reactor. Expansion springs 16 can be inserted or slipped inside the inner tube 10, bladder 20 or inner portion of the base 13b of a cone washer 13 in order to provide additional support to a monolith 1. An expansion spring 16 tends to expand a monolith 1 by pushing a monolith 1 towards the inner wall of an outer tube 7. Thus, a expansion spring 16 is useful to ensure a monolith 1 remains expanded in the desired position during startup and operation of the reactor.

Figure 9:
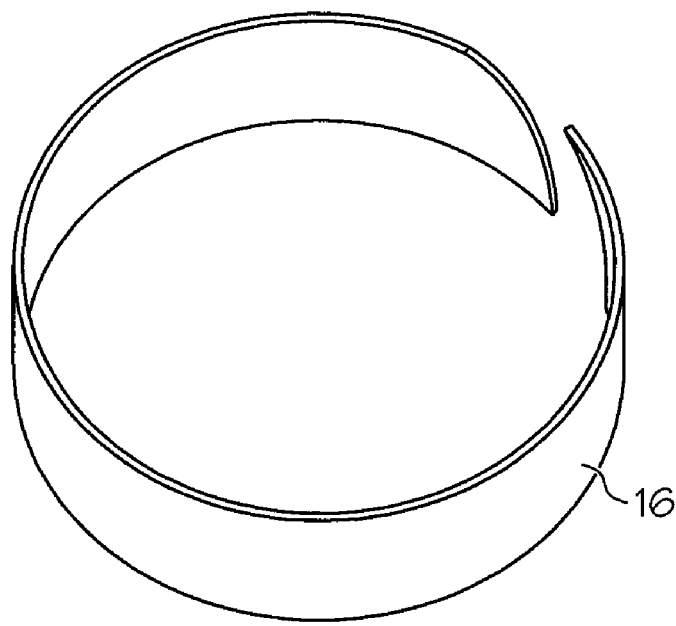
FIG. 9 provides a perspective view of an expansion spring in a compressed state in accordance with an aspect of the present invention.
Figure 10:
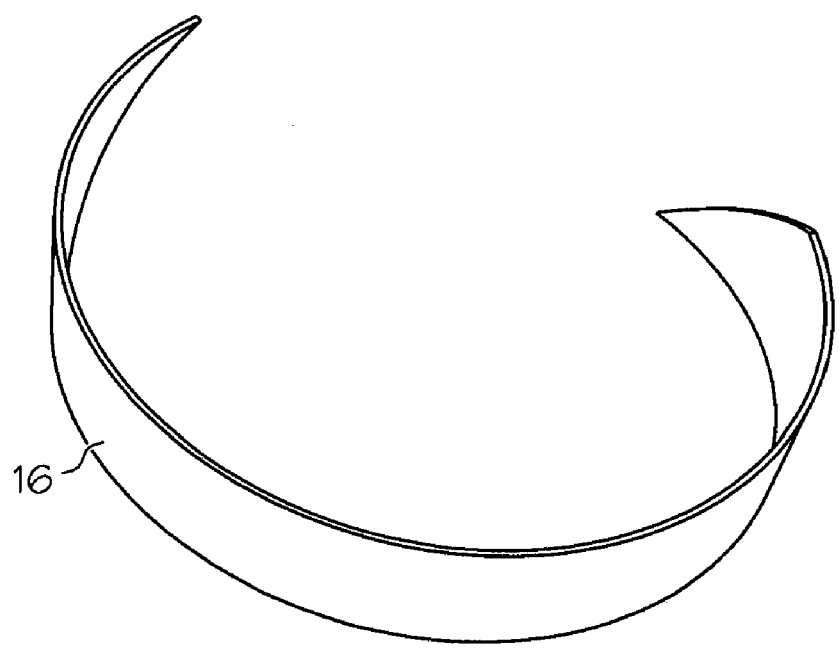
FIG. 10 provides a perspective view of an expansion spring in an uncompressed or free state in accordance with an aspect of the present invention.

In one embodiment, an expansion spring 16 might include C-shaped leaf spring 16. An example of a C-shaped leaf spring 16 is shown in FIGS. 9 and 10. FIG. 9 shows a C-shaped leaf spring 16 in a compressed position whereas FIG. 10 shows the C-shaped leaf spring 16 in a free position. A C-shaped leaf spring 16 can be compressed and inserted into the center of an inner tube 10 at a desired location before tension is released and the spring 16 conforms to the circular shape of the inner tube 10. A C-shaped leaf spring 16 can be made of metal or steel, such as stainless steel or strain-hardened stainless steel. A spring 16 can have any dimension, for example, a spring 16 can be made from flat stainless steel stock having a thickness of about 0.01- to 0.06-inches and a width of about 0.3- to 1.5-inches. The flat stock can be cut to size and subsequently bent into the C-shape of a spring 16.

Figure 11:
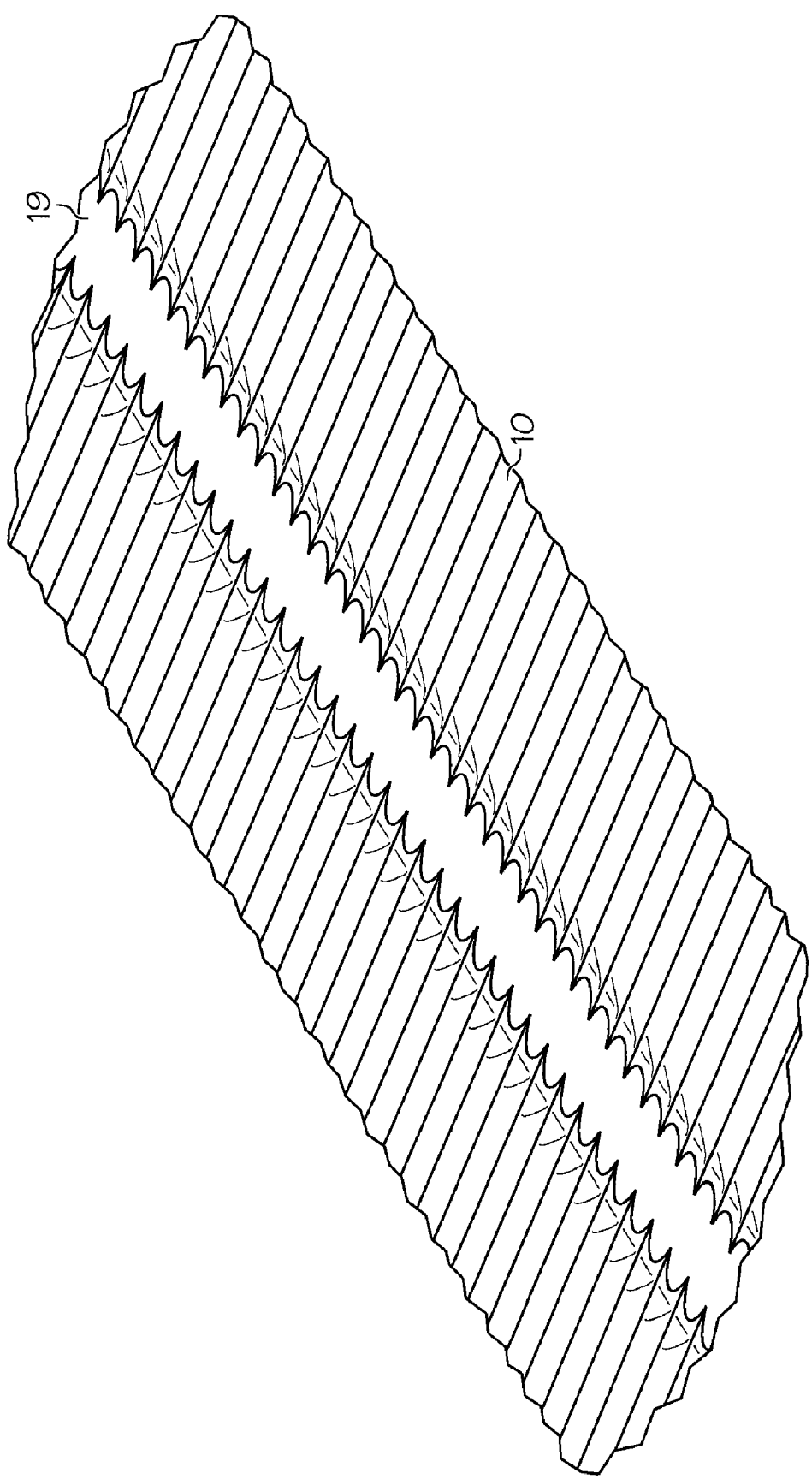
FIG. 11 provides a perspective view of a sheet of corrugated foil used to form an inner tube wherein the foil sheet has a flat channel for nesting an expansion spring as shown in FIG. 9 in accordance with an aspect of the present invention.

A preferred material for forming a C-shaped leaf spring 16 is work-hardened fecralloy, which has a composition of Fe-20Cr-5Al plus traces of rare earth. A C-shaped leaf spring made of fecralloy generally anneals when heated to high temperatures such that the spring loses its capacity to push on the inner surface of a monolith 1 during operation of the reactor. Thus, a spring 16 can be installed inside a inner tube 10, bladder 20 or inner portion of the base of a cone washer 13 at ambient temperature so the spring assists in expanding a monolith 1 into place within an outer tube 7 during installation. Later, during operation of the reactor, exposure to heat will reduce the amount of force the spring 16 exerts on the monolith 1. Because heat lessens the amount of force a spring 16 exerts or pushes on a monolith 1, a spring 16 has a tendency to fall out of position and damage reactor components or can be difficult to remove from the reactor. A bracket 17 can be attached, such as by welding, to an inner tube 10, bladder 20 or on the inner portion of the base 13b of a cone washer 13 in order to catch a falling or dislodged spring 16 and ensure that a spring 16 remains in the desired position. A bracket 17 can be made from metal, steel, stainless steel, ceramic and like materials. For example, a bracket 17 can be made from a thin piece of metal foil extending inward from an inner tube 10, bladder 20 or inner portion of a base 13b of a cone washer 13. An example of a bracket 17 is shown in FIG. 6. As shown, the bracket 17 is positioned below a spring 16 such that the spring 16 rests or sits on the bracket 17. Alternatively, an impression 19 in the form of a shallow indentation can be pressed or formed in an inner tube 10, bladder 20 or inner portion of the base 13b of a cone washer 13 to accommodate a spring 16. Preferably, an impression 19 has a similar shape and dimension as a spring 16 so that the spring 16 can rest in the impression 19 and not slide down the inner tube 10 during reactor operation and/or exposure to high temperatures that can reduce the force that the spring 16 exerts on a monolith 1 or backing 10. As shown in FIG. 11, an impression 19 can flatten the corrugations of backing 10 so that a spring 16 can have a flat surface to nest along. The corrugations of the surrounding surface of the backing 10 not compressed (i.e. above and below the impression 19) extend above the impression area 19 and provide a shelf of corrugations that prevent a spring 16 from sliding up or down during reactor operation.

A C-shaped leaf spring 16 can be located at any position inside an inner tube 10 or bladder 20. A plurality of C-shaped leaf springs 16 can be used to provide additional support to a monolith 1. For example, three springs 16 can be used inside a 6-inch long inner tube 10 positioned inside a 6-inch long monolith 1. The three springs 16 can be equally positioned within the inner tube 10 in order to provide support to the monolith 1.

Figure 12:
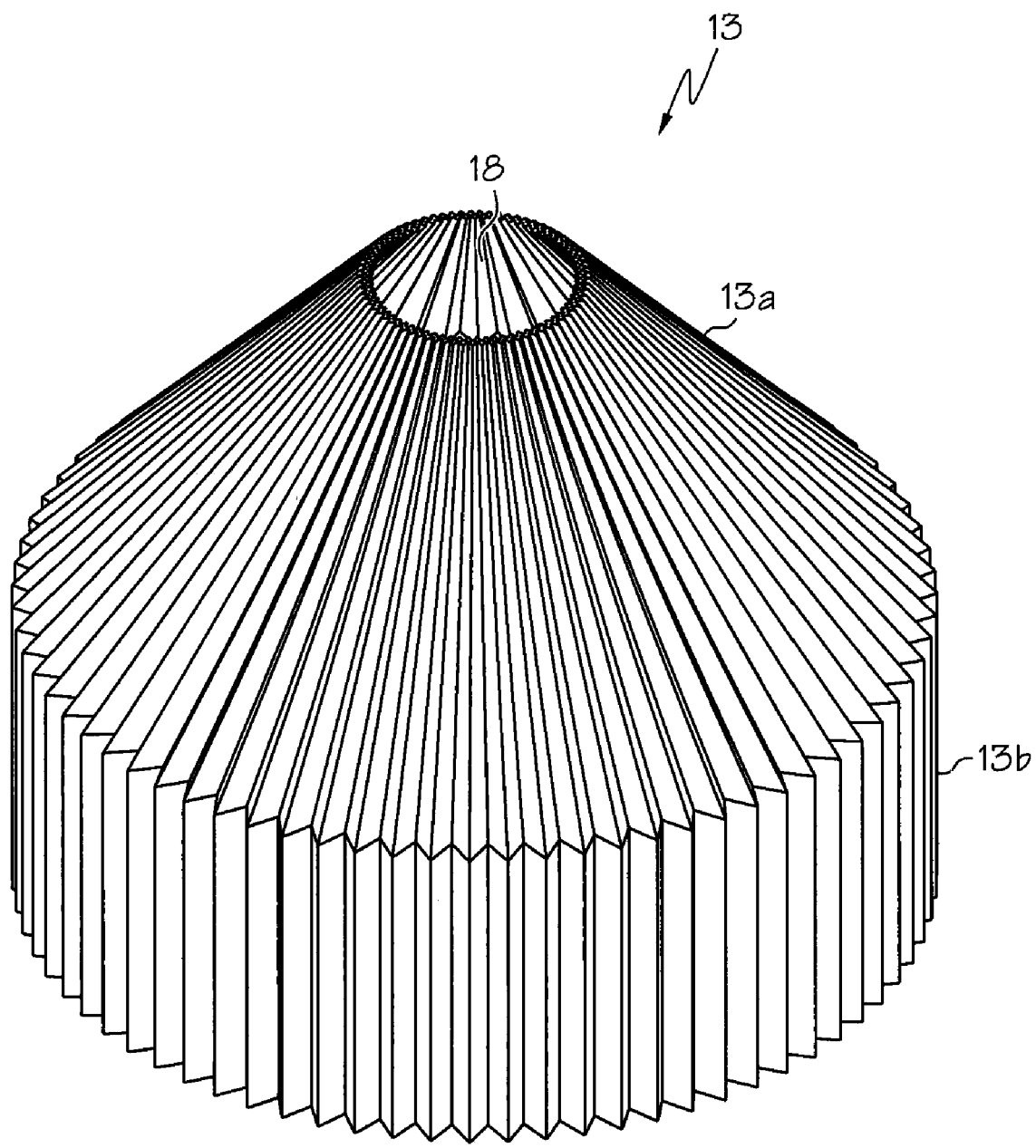
FIG. 12 provides an angled top perspective view of a cone washer made of corrugated foil in accordance with an aspect of the present invention.

As shown in FIG. 2 above, a center support 9 is located longitudinally through the center section of a monolith 1 or plurality of monoliths (not shown in FIG. 2) stacked within an outer tube 7. The center support 9 can be connected to the monolith 1, or inner tube 10, by a washer or cone washer 13. FIG. 12 shows a representative cone washer 13 that can be used to attach a monolith 1 and/or inner tube 10 to a center support 9 or like structure described herein, such as a link piece 40 described below. As shown, a cone washer 13 can be corrugated and have an annular base 13b as a bottom portion and an inward angled top portion 13a that forms the cone shape. This inward angled top portion 13a is similar to the cone portion 24 of a bladder 20 discussed above. A cone washer 13 can be made of metal foil similar to that used to form a monolith 1. Alternatively, a cone washer 13 can be formed from stainless steel or other similar materials or a high strength alloy such as Haynes 230. Preferably, the corrugations of a cone washer 13 are designed to fit or nest in the corrugations of an inner tube 10 or the channels formed by the fins of a monolith 1. Ideally, corrugations on a cone washer 13 match the corrugations on the inner tube 10 so the two pieces fit together tightly in a sealed manner, such as to avoid any fluid leaks. Areas where the cone washer 13 and inner tube 10 or monolith 1 fit together and a gap or open space results, such open spaces can be plugged with a sealant, such as high-temperature alumina based cements or the like. Preferred alumina-based cements sealants include Resbond 907 commercially available from Cotronics, Inc. located in Brooklyn, N.Y.

Figure 13:
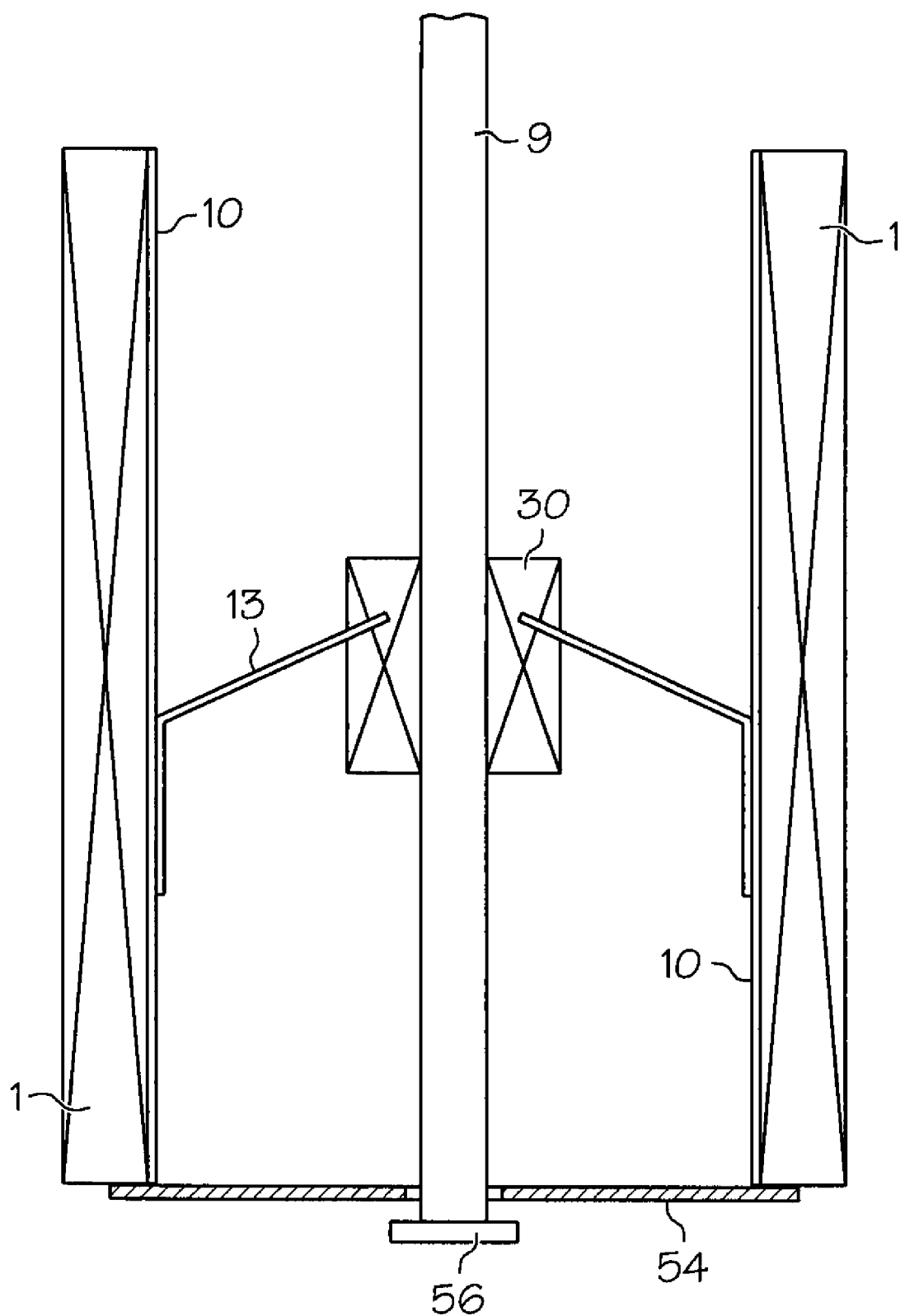
FIG. 13 provides a fragmentary cross-sectional view of a bottom segment of a reactor having a floating ring plate and stop plate attached to the bottom of a center support in accordance with an aspect of the present invention.

FIG. 13 shows a reactor in accordance with an aspect of the present invention. The cone washers 13 in this arrangement are pointed upward, in the direction of the removable cap opening end of a reactor tube. Pointing cone washers 13 upward allows for easy removal of the cone washers 13 from an inner tube 10, or in the case a cone washer 13 is attached to an inner tube 10 pulling upward can remove the inner tube 10 as well. This is advantageous because if the cone washers 13 were positioned facing downward, pulling up on the center support 9 the cone washers 13 are attached to during removal would tend to tighten the cone washers 13 and inner tube 10 against the inner annular face of a monolith 1 since pulling upward would lessen the cone angle and expand the bottom circular base portion 13b of the cone washer 13. By positioning the cone washers 13 to point upward, the weight of a center support 9 and associated components acts on the cone washers 13 and forces the base 13b of the cone washer 13 base against the inner tube 10, and thus also forcing the monolith 1 against the outer tube 7. A cone washer 13 formed of corrugated material, such as metal foil, is expandable in a radial direction as similarly described with regard to a corrugated inner tube 10 or a monolith 1. Additional weight may be added to the post or center support 9 in order push the base 13b of a cone washer 13 towards inner tube 10 at a greater force if desired. An advantage of arranging the cone washers 13 to point upward is that pulling up on the center support 9 will release the weight acting on the cone washers 13 and thus the cone washers 13 can be loosened and removed from an inner tube 10 or monolith 1 in case a cone washer 13 is attached to the monolith 1. Or in other words, by pulling up on a center support 9 increases the angle of the top cone portion 13a and reduces cross-sectional area of the circular base portion 13b.

In another embodiment, a cone washer 13 can be used in conjunction with an inner tube 10 to form a leak proof boundary between the center section of a reactor and a monolith 1. As described above, a cone washer 13 can be attached or positioned in an inner tube 10 in a tight or leak proof manner in order to prevent leaks between the cone washer 13 and an inner tube 10. A center support 9 can further be attached to the cone washer 13 by a bushing 30. The bushing 30 can effectively seal the cone washer 13 to the center support 9 to create a leak proof boundary between the cone washer 13 and center support 9. Thus, the inner tube 10, cone washer 13, bushing 30 and center support 9 can form a leak proof plug in the center section of a reactor. This plug forces or guides substantially all of the fluid flow through the reactor to travel through the monolith 1 and away from the center section. Thus, fluid flow through a monolith 1 is maximized and the conversion rate of reactions in the reactor is increased. To ensure that the inner tube 10 and cone washer 13 are expanded and pressing against the inner annular surface of a monolith 1, a vent can be used in the wall of the inner tube 10. As described above with regard to a bladder 20, a vent allows fluid from the monolith 1 to enter and inflate the center section of a reactor or inside a sealed chamber formed by an inner tube 10 and a cone washer 13. The fluid from the monolith 1 expands and pressurizes the center section of the reactor such that the inner tube 10 and cone washer 13 remain expanded during operation and press against the monolith 1. Thus, the monolith 1 is held in contact with an outer tube 7 during operation by the expanded cone washer 13 and inner tube 10.

As noted above, the cone washer or washer 13 can be attached to a center support 9, such as by welding. In a preferred embodiment, the cone washer 13 can be attached to a center support 9 by means of a bushing 30. A bushing 30 can be made of metal, steel, stainless steel, ceramic, glass or other like materials capable of withstanding high temperatures, such as in excess of 1,000° F. For example, the bushing 30 can be made from a ceramic-based material such as alumina or steatite, which is commercially available from Associated Ceramics, Sarver, Pa. Alternatively, the bushing 30 can be a machined metal part or a pressed metal part.

Figure 14A:
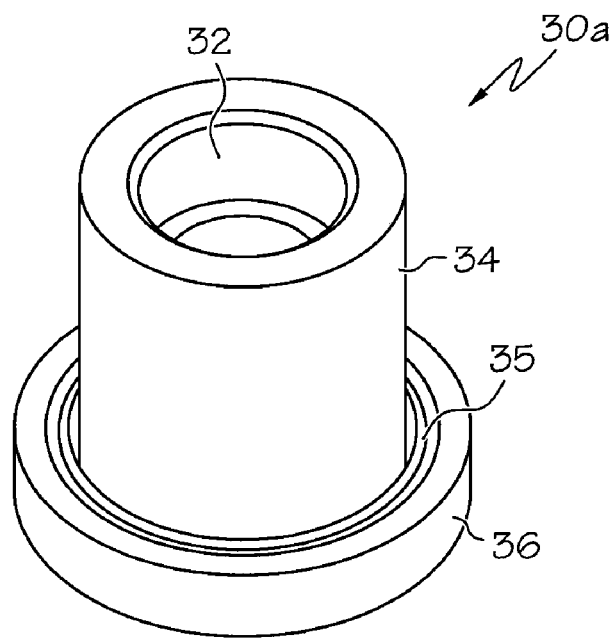
FIG. 14$a$ provides a side perspective view of one piece of a two-piece bushing in accordance with an aspect of the present invention.
Figure 14B:
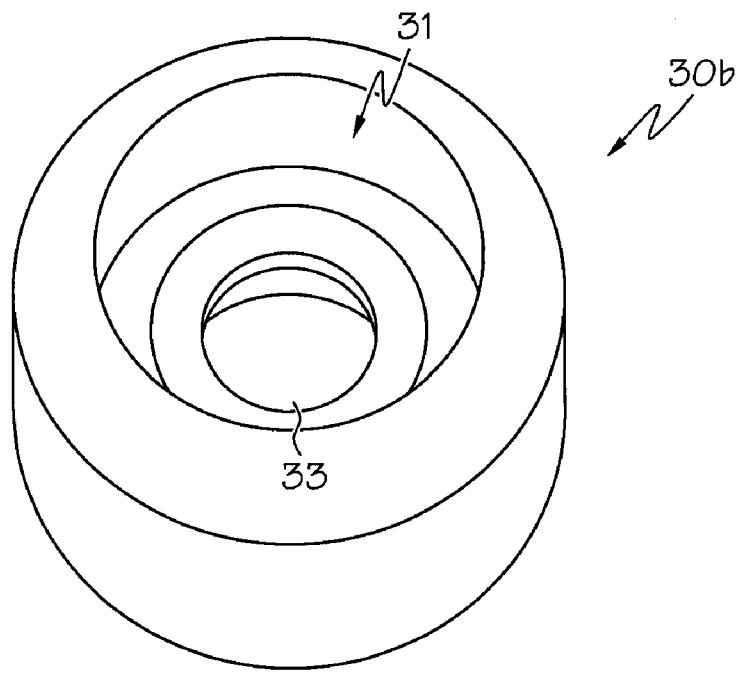

In one embodiment, a perspective view of each piece of a representative two-piece bushing 30 is shown in FIGS. 14a and 14b. FIG. 14a shows a top piece of a two-piece bushing 30 that fits together with the bottom piece shown in FIG. 14b. As shown in FIG. 14a, the top bushing piece 30a has a center hole 32 having a diameter substantially the same as a center support 9 it is designed to slide over. Preferably, the diameter of the center hole 32 is slightly greater than the diameter of a center support 9 so the bushing 30 can slide into a desired location on the center support 9. The structure of the top bushing piece 30a shown in FIG. 14a comprises two concentric cylindrical tube sections 34, 36 joined by a flat connector base 35, all of which are connected together in a unitary fashion to form a continuous part 30.

The two concentric tube sections 34, 36 comprise an outer base cylindrical tube 36 and an inner cylindrical tube 34. The inner cylindrical tube 34 preferably has a smaller diameter than the outer base cylindrical tube 36, as shown in FIG. 14a. Near the transition between the inner tube 34 and the outer base tube 36 there is an open annular ring gap between the two tubes near the connector base 35. The open ring gap is preferably wide enough to accommodate a portion of the cone washer 13, such as the top portion 13a near the center opening 18. The interior surface of the inner cylindrical tube 34 is preferably in contact with a center support 9. The flat connecter base 35 joins the bottom of the outer base tube 36 with the bottom of the inner tube 34 and provides a flat surface for the top potion 13a of the cone washer 13 nesting between the concentric tubes to rest on.

FIG. 14b shows the bottom bushing piece 30b having a hollowed out center section 31 designed to accommodate the inner cylindrical tube 34 of the top bushing piece 30a. In other words, the top cylindrical tube 34 nests or rests inside the center section 31 of the bottom bushing piece 30b. The top edge of the bottom bushing piece 30b preferably has an angled or tapered face for resting against the cone portion of a cone washer 13 as described herein. The bottom bushing piece 30b further comprises an opening 33 or receiving a center support, similar to the opening 32 in the top bushing piece 30a. When the top bushing piece 30a and bottom bushing piece 30b are fit together, the openings 32, 33 of each piece are preferably in register such that a center support 9 can extend through each bushing piece and cone washer 13 positioned between both bushing pieces. The top cone portion 13a or inner cone portion 13c described below is sandwiched between the two concentric tubes 34, 36 of the top bushing piece 30a and the tapered top edge of the bottom bushing piece 30b. The bottom bushing piece 30b can be joined or attached to the top bushing piece 30a a cement or adhesive.

Figure 15:
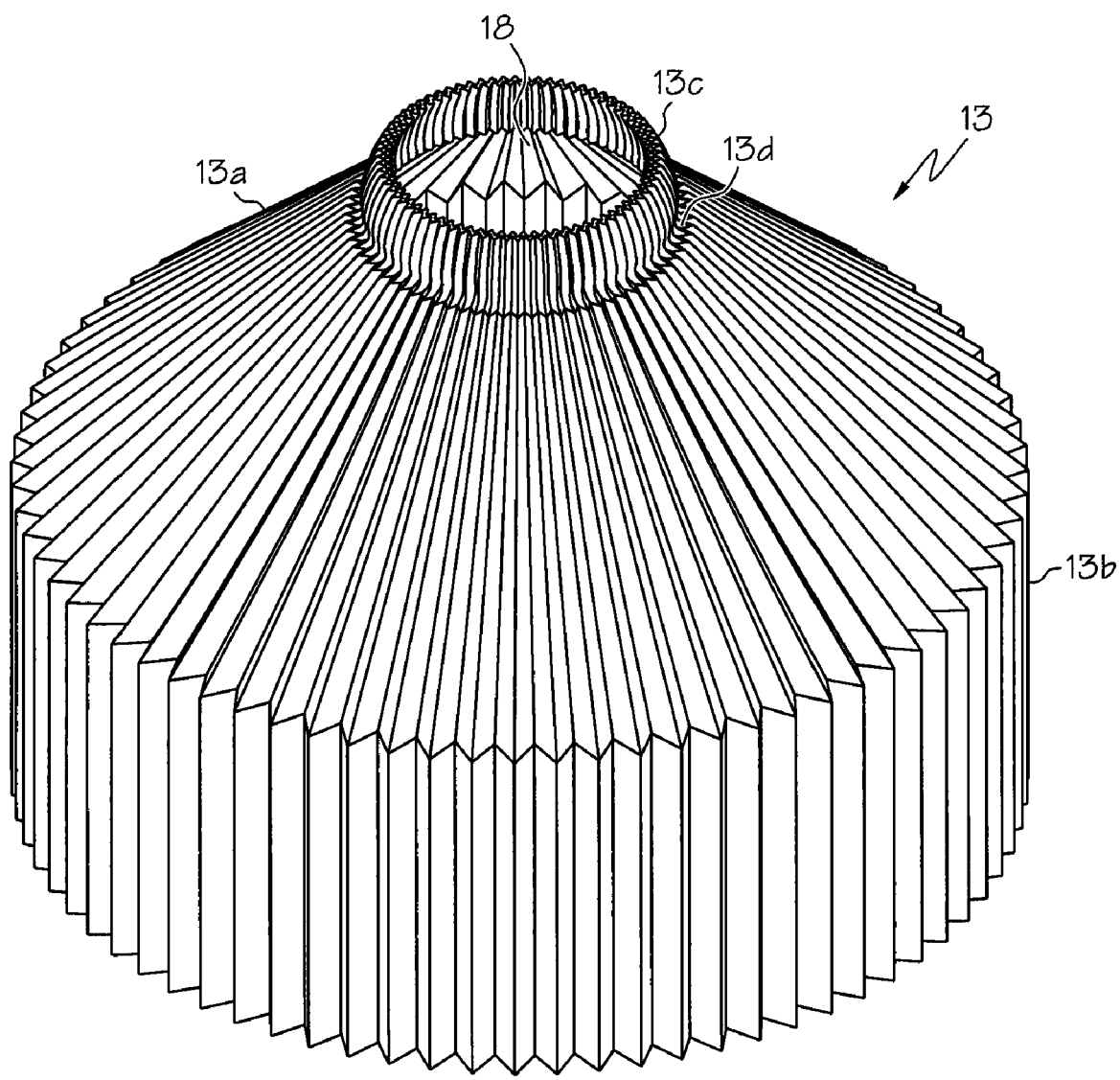
FIG. 15 provides an angled top perspective view of a cone washer made of corrugated foil wherein the cone washer has a pressed feature near its top in accordance with an aspect of the present invention.
Figure 16:
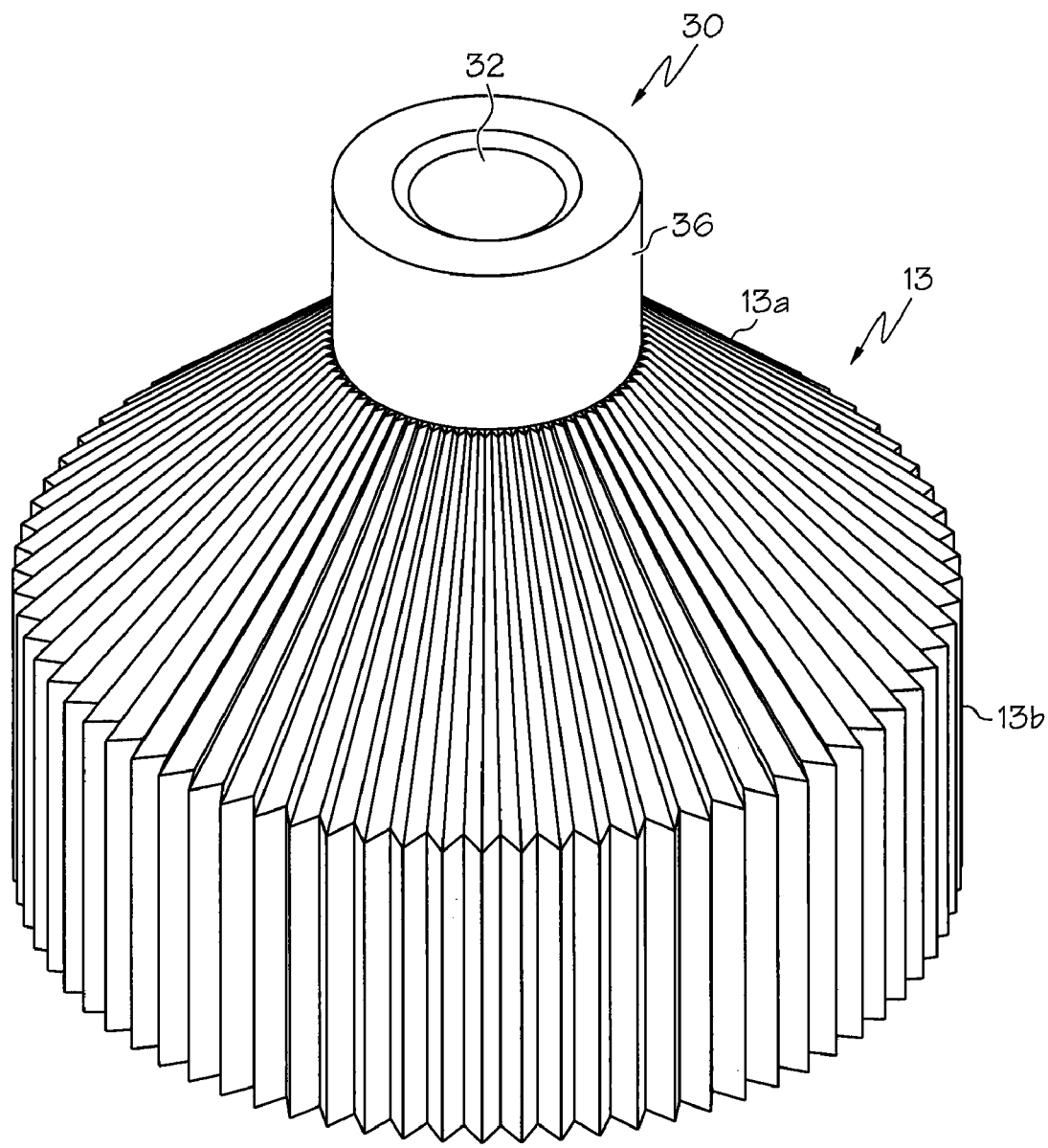
FIG. 16 provides an angled top perspective view of a cone washer having a bushing potted in the top of the cone washer in accordance with an aspect of the present invention.

A cone washer 13 can be modified to better accommodate a bushing 30. For instance, as shown in FIG. 15, a cone washer 13 can be formed with an additional press step in the center of the top cone portion 13a to create an inner cone portion 13c having a thin flat base 13d around the bottom of the inner cone portion 13c that is connected to the top of the larger cone portion 13a of the cone washer 13. The inner cone portion 13c can engage and nest in the axial gap of the bushing 30 described above. For example, the inner cone portion 13c can sandwiched or trapped between the connector base 35 region of a top bushing piece 30a and the top tapered edge on the bottom bushing piece 30b. In this arrangement, the outer base 36 of the top bushing piece 30a is positioned around the inner cone portion 13c and the top tapered edge of the bottom bushing piece 30b is positioned inside the inner cone portion 13c so the cone washer 13 is secured to the bushing 30. The inner tube 34 of the top bushing piece 30a extends downward through the center hole 18 of the inner cone portion 13c. As positioned over the inner cone portion 13c, the flat connector base 35 of the top bushing piece 30a can rest on the top of the inner cone potion 13c to allow the top bushing piece 30a to sit on the inner cone portion 13c as shown in FIG. 16. In other words, the inner cone portion 13c is potted in the bushing 30 and the remaining larger cone portion 13a and annular base 13b is allowed to flex as the weight of a center support 9 or like structure acts on the cone washer 13. The cone washer 13 or inner cone portion thereof 13c can be secured to a bushing 30 with an adhesive, sealant or cement, such as a high-temperature cement. A high-temperature cement might include, for example, a alumina-based cement such as Resbond 907 commercially available from Cotronics, Inc. located in Brooklyn, N.Y. The interior surface of the center hole 32 of the bushing that slides over a center support 9 can be secured to a center support 9 by a similar adhesive or sealant discussed above, such as the alumina-based cement available from Cotronics, Inc. Alternatively, welding or brazing can be used to secure a cone washer 13 to a bushing 30 and/or a bushing 30 to a center support 9.

Other variations of the bushing as shown in FIGS. 14a and 14b can be used. For example, a one-piece bushing 30 (not shown) can be used to secure a cone washer 13 to a center support 9. A one-piece bushing 30 can be cast on a cone washer 13, preferably around the inner cone portion 13c thereof (not shown). Casting material might include ceramic or metal powder. In another example, a three-piece bushing can be used. For example, the top bushing piece 30a can be split into two pieces, preferably it is split along its center. A three-piece bushing is discussed in more detail below with regard to a link piece 40.

Figure 17:
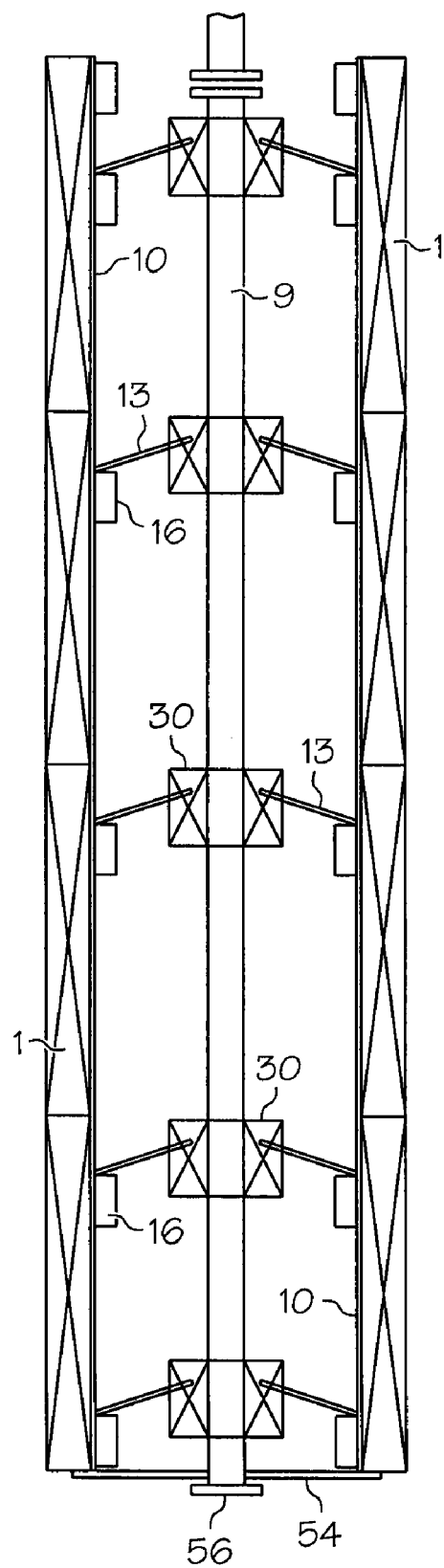
FIG. 17 provides a fragmentary cross-sectional view of a reactor having a string or series of monoliths connected together and attached to a center support in accordance with an aspect of the present invention.

As shown in FIG. 17, a plurality of monoliths 1 can be stacked together and a center support 9 can be used to provide a center structure for one or more cone washers 13 to attach. As discussed above, a center support 9 can be a single metal rod or cylindrical tube extending longitudinally through the center section of a reactor. A center support 9 can be made of metal, alloys, steel, stainless steel, ceramic or other like materials capable of withstanding high temperatures, such as in excess of 900° C. For example, a center support 9 can be made of RA 330 alloy, or Inconel 600 or 625 or 800, which are commercially available from Rolled Alloys of Temperance, Mich. Alternatively, a center support 9 can comprise smaller individual rods or cylindrical tubes that are joined together by a flexible attachment means, such as a cable or chain (not shown). The individual rods can be of any length, and preferably are long enough to sufficiently attach a cone washer 13 thereto. Thus, an individual smaller rod is needed for each cone washer 13 used in the reactor arrangement. The weight of each individual rod is preferably sufficient to act on a cone washer 13 and force the annular base 13b of a cone washer 13 against an inner tube 10 and expand a monolith 1 to come into contact with an outer tube 7.

Figure 18:
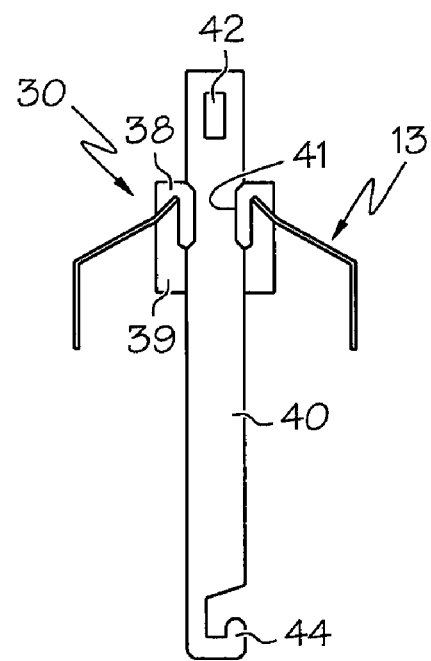
FIG. 18 provides a cross-sectional view of a link piece for connecting reactor segments together in accordance with an aspect of the present invention.

Turning to FIG. 18, a link piece 40 is shown. A link piece 40 can be used in place of or in combination with a center support 9 as discussed above in order to string multiple SSRs together. A link piece 40 can be made of metal, alloys, steel, stainless steel, ceramic or other like materials capable of withstanding high temperatures, such as in excess of 900° C. For example, a link piece 40 can be made of RA330, or Inconel 600 or 625 or 800 which is commercially available from Rolled Alloys of Temperance, Mich. A preferred link piece 40 is shown in FIG. 18. The link piece 40 of FIG. 18 can be made from a flat piece of metal having a long rectangular shape. The link 40 can have an opening or slot 42 at the top end and a hook 44 at the bottom end. Preferably, the hook portion 44 of the link 40 is of a shape and size to engage and hook onto the slot 42 of another link piece 40. Thus, the hook 44 on one link piece 40 connects in the slot 42 of another link piece 40 and so on until the desired length in achieved with a string of link pieces 40. In the case the link pieces 40 have a flat shape as shown, the pieces 40 will link together such that every other link 40 in a chain is parallel and the connecting links 40 are in a perpendicular (i.e. rotated 90 degrees) position relative to one another. The hook 44 and slot 42 configurations allows the SSRs to move axially relative to one another. Alternatively, the link piece 40 can have a round center section with flat ends or be a flexible cable with a ring hook at one end and a hook at the other end (not shown).

A link piece 40 can be secured to a cone washer 13 by a bushing as described above. As shown, a bushing 30 can fit around a link piece 40 slightly below the top slot 42. Alternatively, a bushing 30 can be secured at any location along the length of a link piece 40 between its top slot 42 and bottom hook 44. To accommodate a rectangular shaped link piece 40, the center hole 32 of a bushing 30 can be altered to match the cross-section shape of a link piece 40. In the case of a flat, rectangular link piece 40, notches or grooves 41 can be formed along two edges of the piece 40 to allow a custom fit with a bushing 30. Preferably, a two-piece bushing 30, comprising an inner bushing 38 and an outer bushing 39 as shown in FIG. 18, is used to secure a cone washer 13 to a link piece 40. The inner bushing 38 can be further split into two pieces so that the two pieces can fit together around the notched section 41 of a link piece 40 and mechanically lock into the notch 41. The outer bushing 39 fits around a portion of the inner bushing 38 such that the two bushing pieces (i.e. the inner and outer bushing) can form a single bushing 30 as shown. The inner bushing 38 and outer bushing 39 can be joined together, for example, with an adhesive, sealant, cement or similar material as known in the art. Prior to joining the two bushing pieces 38, 39, a cone washer 13 can be sandwiched in between the two bushing pieces as shown in FIG. 18. In one example method, an inner bushing piece 38 can be cemented to a link piece 40 followed by a cone washer 13 and an outer bushing piece 39, in a stacked arrangement with the cone washer 13 facing the inner bushing piece 38, being cemented onto the inner bushing piece 38. The cemented-on bushing 30 being locked around the notched section 41 of the link piece 40 effectively secures the cone washer 13 to the link piece 40 in a manner that prevents the bushing 30 from sliding up and down along the piece 40, for example, during installation or operation of the reactor.

Figure 19:
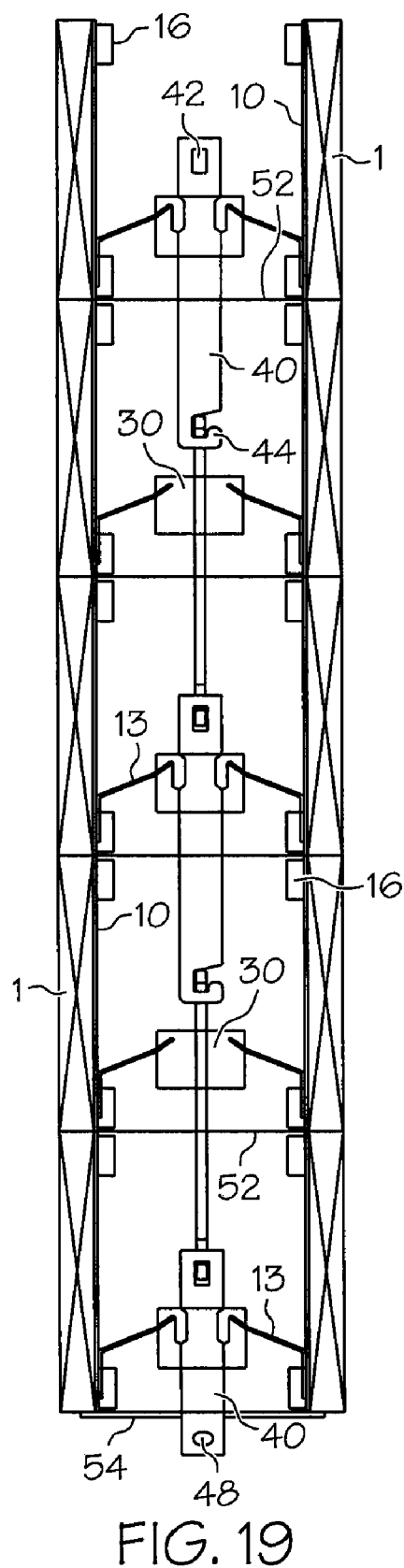
FIG. 19 provides a fragmentary cross-sectional view of a reactor having a string of link pieces connected together in accordance with an aspect of the present invention.

FIG. 19 shows a string or assembly of link pieces 40 connected together in a reactor of stacked SSRs. Each link piece 40 is a part of an individual SSR and the link pieces 40 allow the individual SSRs to be connected together. The link pieces 40 are configured to for a down flow reactor system such that the cone washers 13 are near the bottom of each monolith 1. In the case of an up flow reactor system, the cone washers 13 can be positioned near the top of each monolith 1 (not shown). As shown, there is one link piece 40 for each monolith 1 and each link piece 40 provides one cone washer 13 to interface with the backing 10 of each monolith 1. Thus, each link piece 40 of the reactor system forms a bladder for each individual SSR by interfacing the cone washer 13 with the backing 40 of a monolith 1. Additional features shown in FIG. 19 include a separating disk 52 that can be placed between each individual SSR and a floating ring plate 54 at the bottom of the SSR string. The floating ring plate 54 engages the bottom-most monolith 1 of the SSR string during removal from an outer tube 7 (not shown) as the link assembly is pulled upward. The floating ring plate 54 can also serve to collect any broken components or other fragments that may fall during reactor operation or removal. The floating ring plate 54 and its function are further described below. The bottom-most link piece 40 can have a different shape and design in order to accommodate the floating ring plate 54. For example, the bottom-most link piece 40 engaging with the floating ring plate 54 does not require a hook 44 at its bottom end. As shown, the bottom-most link piece 40 can have a single opening 48 for housing a locking pin or similar structure that prevents the link piece 40 from sliding up through the floating ring plate 54, such as during removal of the SSR string when the link assembly is moved upward out of an outer tube 7 by pulling upward on the top-most link piece 40.

In order to remove the reactor assembly, such as a string of monoliths 1 and associated components such as a series of cone washers 13, from an outer tube 7, one must pull up on a center support 9 or similar structure to disengage the cone washers 13 from expanding and pushing on a monolith 1. Once the cone washers 13 are constricted (i.e. not pressing on the inner tube 10 and monolith 1), and the monolith 1 is partially collapsed (i.e. not pressing on the outer tube 7), the reactor assembly can be lifted out of the outer tube 7. A floating ring plate 54 can be positioned at the bottom of a center support 9 or similar structure to provide a base for lifting the reactor assembly out of an outer tube 7. The floating ring plate 54 creates a solid surface scraper that can allow a monolith 1 or series of stacked monoliths 1 to be pulled out of an outer tube 7 with uniform pressure being exerted on the annular cross section of a monolith 1. Thus, a monolith 1 can be pulled out even if portions are stuck to an outer tube 7 or other components, such as the cone washers 13, fail or are damaged or broken. For instance, the floating ring plate 54 may catch a damaged cone washer 13 that breaks away from a bushing 30 and falls down the center of the reactor.

A floating ring plate 54 can be a circular disk having a diameter equal to or slightly less than the outer diameter of a monolith 1. It is to be understood that a monolith 1 as shown in FIG. 1 has an inner diameter corresponding to the inner surface preferably in contact with an inner tube 10 and an outer diameter corresponding to the outer surface preferably in contact with an outer tube 7. As shown in FIGS. 13 and 19, a floating ring plate 54 can have a diameter less than the outer diameter of a monolith 1 but greater than the inner diameter of the same monolith 1. A floating ring plate 54 can have a center hole substantially equal to a center support 9 or similar structure, such as a link piece 40. The center hole of the floating ring plate 54 engages a center support 9 and can slide freely along its length. In a preferred position, a floating ring plate 54 is located below a monolith 1 or a plurality of monoliths 1 stacked together (shown in FIG. 19). A stop plate 56, as shown in FIG. 13, can be attached to the bottom of a center support 9. The stop plate 56 can be a solid disk without a center hole and having a diameter greater than that of a center support 9, and preferably a diameter only slightly greater than a center support 9. The stop plate 56 can be attached to a center support 9 as is conventional in the art, such as by welding. As the floating ring plate 54 slides along the length of a center support 9, the stop plate 56 prevents the floating ring plate 54 from sliding off the end of a center support 9. When a center support 9 is pulled up to remove the reactor assembly, the stop plate 56 engages the floating ring plate 54 and allows the ring plate 54 to come into contact with the bottom-most monolith 1 in order to slide the monolith 1 and any monoliths 1 stacked on top of the bottom-most monolith 1 out of an outer tube 7.

As discussed above, pulling up on a center support 9 tends to disengage cone washers 13 from a backing 10 and a monolith 1 from an outer tube 7 because the components (i.e. the cone washer 13 and/or monoliths 1) are allowed to be collapsed. During operation of a reactor, pressure within the reactor can similarly act to collapse cone washers 13 or inner tube 10, and/or monoliths 1, which is not desirable. For example, the pressure drop across a 6-inch long monolith 1 reactor can be as much as 2 to 3 pounds per square inch (psi). Such a pressure drop can create loads on the reactor assembly components, such as the cone washers 13 or inner tube 10, which can deform the components or monolith 1 or counteract any expansion forces created by the weight of a center support 9. It has been discovered that select placement of a cone washer 13 along the length of the inner tube 10 can reduce or eliminate deformation or counteracting of expansion forces as mentioned above. The desired placement of a cone washer 13 depends on whether the reactor receives fluid flow from the bottom (i.e. up flow) or from the top (i.e. down flow), as is labeled in FIG. 20.

Figure 20:
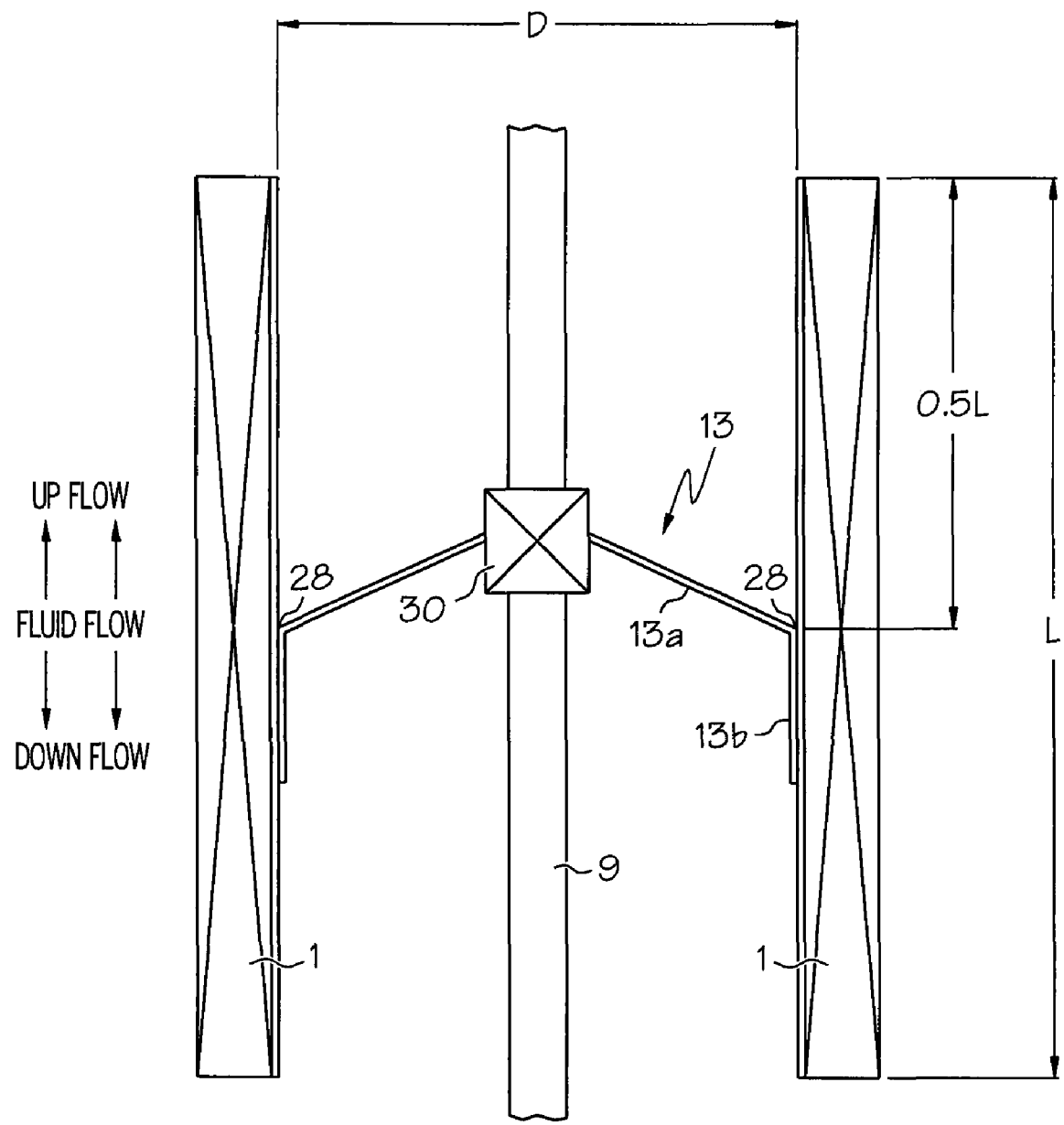
FIG. 20 provides a fragmentary cross-sectional view of a segment of a reactor having a monolith length (L) and monolith inner diameter (D) in accordance with an aspect of the present invention.

FIG. 20 shows a reactor assembly having a preferred cone washer 13 placement in down flow system. In a down flow system, fluid flow enters the top of a monolith 1 and exits the bottom. A monolith 1 has a length (L) and diameter (D) as shown. The length (L) of the monolith 1 is measured from the top surface of the monolith to the bottom surface of the monolith 1. The diameter (D) corresponds to the outer annular diameter of a monolith 1. The circular base 13b of a cone washer 13 is in contact with the backing 10 at the inner annular surface of a monolith 1. The top of the cone base 13b forms an elbow joint 28 between the inner tube 10 and the cone portion of the cone washer 13 that angles away from the inner tube 10. In other words, a cone washer 13 having a cylindrical base portion 13b and a top cone portion 13a can be positioned inside an inner tube 10 or bladder 20 such that the base portion 13b is in contact with the inner tube 10 or bladder 20 and the top cone portion 13a angles inward and away from the inner tube 10 or bladder 20 surface to form an elbow joint 28. The elbow joint 28 is preferably located greater than 0.5 L (i.e. greater than 50 percent of L) from the top surface of a monolith 1. Locating the elbow 28 greater than 0.5 L from the top surface of a monolith 1 prevents counteracting expansion forces of fluid pressure or pressure drop in the reactor. In this arrangement, only one cone washer 13 can be used for a 6-inch monolith (i.e. L equals 6 inches). Thus, depending on the length of the monolith 1 used, additional cone washers 13 may be eliminated and therefore reducing the overall costs of manufacturing a reactor.

In one example, a monolith 1 can have a diameter (D) of 4 inches and a length (L) of 6 inches. The elbow joint 28 formed by a cone washer 13 positioned inside the inner tube 10 attached to the monolith 1 is preferably located greater than 3 inches and preferably about 4.5 inches from the top of the monolith 1 in order to reduce or eliminate deformation of the monolith 1 and/or any counteracting expansion forces caused by pressure from fluid flowing through the monolith 1. In the event the elbow joint 28 of the cone washer 13 is placed less than 3 inches from the top of the monolith 1, additional weight can be added to a center support 9 or similar structure to offset any counteracting expansion forces caused by fluid flow.

In an up flow system, fluid flow enters the bottom of a monolith 1 and exits the monolith 1 at the top. The elbow joint 28 in an up flow system is preferably located greater than 0.6 L (i.e. greater than 60 percent of L) from the bottom surface of a monolith 1. As similarly described above, locating the elbow joint 28 formed by a cone washer 13 greater than 0.6 L from the bottom surface of a monolith 1 prevents counteracting expansion forces of fluid pressure or pressure drop in the reactor. In one example, a monolith can have a diameter (D) of 4 inches and a length (L) of 6 inches. A cone washer 13 positioned inside the inner tube 10 attached to the monolith 1 is preferably located greater than 3.6 inches, and more preferably about 4.5 inches, from the bottom surface of the monolith 1 in order to reduce or eliminate deformation of the monolith 1 and/or any counteracting expansion forces caused by pressure from fluid flowing through the monolith 1. In the event the cone washer 13 is placed less than 3.6 inches from the bottom of the monolith 1, additional weight can be added to the center support 9 to offset any counteracting expansion forces caused by fluid flow.

The above-described reactor and associated components and variations thereof can be installed in a variety of methods as described herein. In one embodiment, the reactor is inserted within a cylindrical tube 7 that encloses or encases the reactor. A reactor monolith is preferably designed so that the outer diameter of a monolith 1 is about 1/16-inch larger than the inner diameter of an outer tube 7. Prior to insertion, a monolith 1 needs to be compressed in order to slide or insert the monolith 1 in the outer tube 7. An installation method can be as follows: (1) compress a monolith 1 to a diameter about 1/4-inch less than the inner diameter of an outer tube 7, (2) insert a monolith 1 in an outer tube 7, (3) release a monolith 1 so the fins expand to come in contact with an outer tube 7, (4) and optionally tap on a center support 9 or similar structure to ensure the monolith 1 is seated on an end feature of outer tube 7 or on the previously installed monoliths Compressing a monolith 1 can be accomplished in a variety of ways, for example, with a compressing means described below. Compressing means can include a band or thin band, slip tube, cable, string, paper, foil and the like. For example, thin bands can be positioned around the outer circumference of a monolith 1 in order to hold the monolith 1 in a compressed state until installation in an outer tube 7 is completed. A thin band can be made from temperature- or chemical-sensitive material such that the band breaks or releases a compressed monolith 1 under reactor operating conditions, such as high temperature or exposure to an acidic or corrosive environment. In another example, a metal band can be used to compress a monolith 1. Two ends of a metal band can be secured or adhered together with a temperature- or chemical-sensitive adhesive or glue that dissolves or releases the two ends under operating conditions, such as at a specified temperature that corresponds to the temperature-sensitive material used. As a band or plurality of bands break, the monolith is free to expand and preferably comes into contact with an outer tube 7 that encases the monolith 1. In the compressed state, a monolith 1 can be lowered into an outer tube 7 with an installation tool, such as a simple hook with a local ratchet release or a remote release. Alternatively, a band can be made of tape, paper, foil, wire, combinations thereof and the like. A band can be positioned at any location on the outer surface of a monolith 1. In the case a monolith 1 has cuts 5 as discussed above, the bands can be positioned in the cuts.

In another embodiment, a monolith 1 can be compressed with a thin band or plurality of bands having a release mechanism, such as a cutting device, release pin or buckle. For example, a thin band can be made from fabric or plastic and have a cutting device attached thereto. The cutting device can be a piece of metal having a sharp cutting section for engaging and cutting through the thin band. The cutting device attached to the thin band can be engaged with a tool, such as an installation tool or a lead attached to the cutting device. The lead, such as a string, can be secured to the cutting device. The lead can be pulled in order to release the thin band after the compressed monolith 1 is inserted into an outer tube 7.

In yet another embodiment, a monolith can be held in a compressed state with a slip tube (not shown). The slip tube can be a thin flexible tube made from plastic, polymeric material, foil, combinations thereof and the like. The slip tube fits around a portion of the exterior of a monolith 1 and is capable of retaining the monolith 1 in a compressed state until the monolith 1 is installed in a containment device, such as an outer tube 7. The slip tube can fit around and cover the entire outer exterior surface of a monolith 1. Alternatively, the slip tube can fit around and cover only a portion of the outer exterior surface. The slip tube can be pulled off of a monolith 1 after being installed in an outer tube 7. Preferably, a tool is used to hold pressure on the monolith 1 down as the slip tube is pulled away from and off of the monolith 1, which allows the monolith to expand in the outer tube 7. In the case of a string of monoliths 1, a single slip tube can be used to hold the entire string of monoliths 1 in a compressed state. After the string of monoliths 1 is inserted into an outer tube 7, the slip tube can be pulled away from and off of each monolith. The string of monoliths 1 is released from the slip tube one by one.

In yet another embodiment, a monolith 1 can be held in a compressed state by a combination of devices, such as those described above. For example, a string of monoliths joined together can be held in a compressed state by using a combination of bands and a slip tube. A slip tube can be fit around the top monolith 1 in the string and bands can be positioned around each monolith 1 remaining in the string below the top monolith. Once the string of compressed monoliths 1 is inserted in an outer tube 7, with the top monolith being at the top end of the outer tube 7, the slip tube can pulled off the top monolith 1 thereby allowing it to expand and come into contact with the inner wall of the outer tube 7. In the expanded state, the top monolith 1 of the string is locked into place in the outer tube 7 and thus the remaining monoliths positioned below the top monolith 1 can not move or slide in the outer tube 7. In other words, the remaining monoliths in the string are secured in an axial position because the top monolith 1 is pre-expanded. The remaining monoliths can expand once the bands are released, for example, in the case of temperature-sensitive bands being melted or released during reactor operating conditions. This method describes an installation from the top of the tube. A mirror-image method is applicable if installing from the bottom.

Figure 21A:
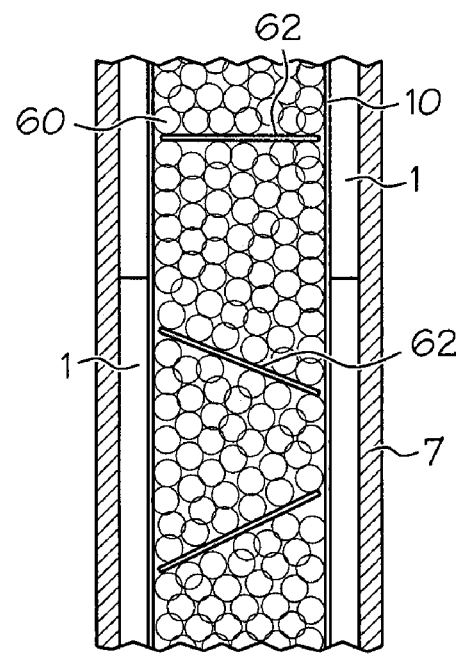
FIG. 21A provides a fragmentary cross-sectional view of a reactor having media positioned against the inner wall of a backing in accordance with an aspect of the present invention.
Figure 21B:
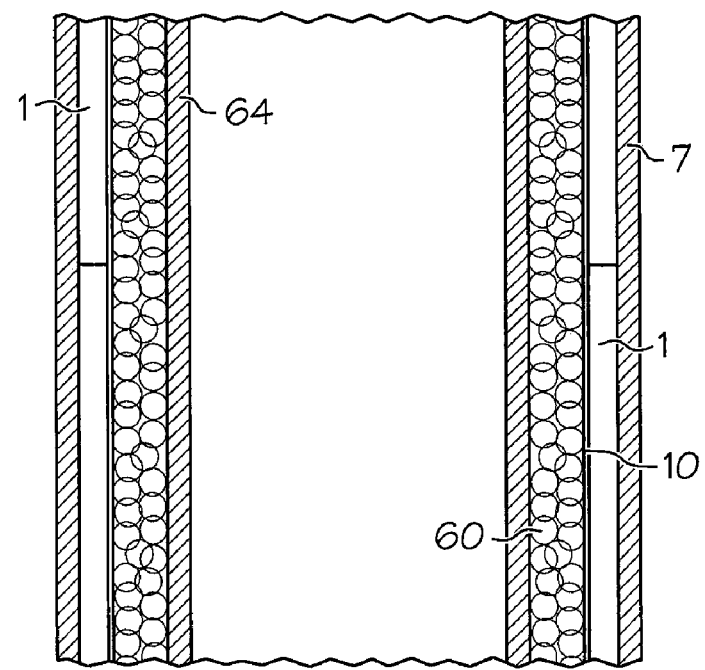
FIG. 21B provides a fragmentary cross-sectional view of a reactor having media positioned against the inner wall of a backing in accordance with an aspect of the present invention.

The reactor systems described above generally have cone washers 13 and/or a center post or center support 9 that assist in expanding a monolith 1, preferably so that a monolith 1 is in contact with an outer tube 7. In an alternative embodiment, as shown in FIG. 21A, a monolith 1 can be expanded by conventional media 60 that occupies the area in the center of a monolith 1 at the center of a reactor. The conventional media 60 can be, for example, ceramic media 60 or beads that can coated with a catalyst if desired. The weight of the media 60 preferably expands a monolith 1 and forces the monolith 1 against an outer tube 7. In the case that a monolith 1 has backing 10, the media 60 can be in contact with the backing 10 as shown in FIGS. 21A and 21B. Depending on the shape and size of media 60 used, the packing density of the media 60 can be varied. Preferably, the media 60 is packed inside the annulus of a monolith 1 such that the media 60 directs or forces about 75 to 95 percent of the total fluid flow into the monolith 1 section, with the balance of the fluid flow through the media section 60. This fluid flow balance is advantageous from a reaction standpoint because the fins of a monolith 1 generally receive heat from an outer tube 7. In the case the media 60 cannot be packed inside the annulus of a monolith 1 to allow the preferred flow balance, flow restrictors 62 can be selectively placed in the media 60 or attached to backing 10 to increase resistance to flow through the media 60 section. Flow resistance through the media 60 creates a pressure drop inside the annulus of a monolith 1, thus forcing fluid flow through the monolith 1 and creating the desired flow balance. The flow restrictors 62 can be of any conventional shape and size. For example, the flow restrictors 62 might include a circular fin, baffle or ellipse that can further contain orifice holes or be placed at an angle in the media 60.

As shown in FIG. 21B, media 60 can be placed between a casing 64 and a monolith 1 or optionally a monolith 1 with backing 10. Thus, the media 60 can accommodate reactor systems having an annulus region between the outer tube 7 and casing 64 wherein fluid flow only travels through the annulus region. In the preferred arrangement, the media 60 is in contact with the casing 64 and the monolith 1 is in contact with the outer tube 7. Heat transferring through the casing 64 or outer tube 7 can be in contact with fluid flowing either through the media 60 or monolith 1. The fluid flow balance between the media 60 and monolith 1 can be controlled by altering the media 60 density or adding flow restrictors 62 (not shown in FIG. 21B) to the media 60 section as similarly described above and shown in FIG. 21A. For example, in a reactor system that transfers 60 to 80 percent of the heat through the outer tube 7, it is preferred that the fluid flow through the reactor be controlled to match the heat transfer ratio between the casing 64 and outer tube 7. In this case, it is desirable to have 60 to 80 percent of the fluid flow travel through the monolith 1 section, wherein the remaining fluid flows through the media section 60 that is in contact with the casing 64.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A reactor comprising:
   a monolith having a top end and a bottom end, said monolith comprising a plurality of fins in an annular arrangement wherein said fins define flow channels for receiving fluid flow through said reactor such that said fluid flows through said monolith from one of said top end or bottom end to the opposite of said top end or bottom end;
   said monolith having an outer annular surface forming an outer annular diameter and an inner annular surface forming an inner annular diameter, said inner annular surface defining a center section of said reactor;
   said monolith having a cut along an annular surface, said cut along an annular surface forming an open channel extending around a portion of said an annular surface; and
   an outer tube adjacent said outer annular surface of said monolith.

2. The reactor of claim 1, said cut being along said outer annular surface, said cut along said outer annular surface forming an open channel extending around a portion of said outer annular surface.

3. The reactor of claim 1, said cut being along said inner annular surface, said cut along said inner annular surface forming an open channel extending around a portion of said inner annular surface.

4. The reactor of claim 3, further comprising a flow diverter, said flow diverter being located within said cut along said inner annular surface of said monolith.

5. The reactor of claim 1, said monolith having a fin density greater than 5 fins per inch of length as measured along said inner annular diameter of said monolith.

6. The reactor of claim 1, further comprising an inner tube adjacent said inner annular surface of said monolith.

7. The reactor of claim 6, further comprising an expansion spring inside said inner tube, wherein said expansion spring is in contact with said inner tube.

8. The reactor of claim 1, further comprising a cone washer inside said inner tube.

9. The reactor of claim 1, further comprising a center support extending longitudinally through said center section of said reactor.

10. The reactor of claim 9, said center support being a series of link pieces connected together, said series comprising at least two link pieces.

11. A reactor comprising:
    a series of monoliths stacked together, wherein each monolith in said series having a top end and a bottom end, and each monolith in said series comprises a plurality of fins in an annular arrangement wherein said fins define substantially vertical flow channels for receiving fluid flow through said reactor such that said fluid flows through said monolith from one of said top end or bottom end to the opposite of said top end or bottom end;
    said each monolith having an outer annular surface forming an outer annular diameter and an inner annular surface forming an inner annular diameter, said inner annular surface defining a center section of said reactor;
    a series of bladders stacked together adjacent said inner annular surface of said series of monoliths, said series of bladders forming a boundary between said series of monoliths and said center section of said reactor; and
    an outer tube adjacent said outer annular surface of said monolith.

12. The reactor of claim 11, said series of bladders comprising a top bladder, a middle bladder and a bottom bladder, wherein each bladder in said series of bladders comprises a cone portion extending inward towards said center section and away from said monolith.

13. The reactor of claim 12, wherein at least one bladder in said series of bladders comprises a vent for permitting fluid flow through said boundary between said center section and said monolith.

14. The reactor of claim 12, said each cone portion has a center opening for receiving a center support.

15. The reactor of claim 12, wherein at least one bladder in said series comprises an expansion spring inside, wherein said expansion spring is in contact with said at least one bladder in said series of bladders.

16. A reactor for use in a fluid flow system comprising:
 a monolith having a length measured from the top surface of said monolith to the bottom surface of said monolith;
 said monolith comprising a plurality of fins in an annular arrangement wherein said fins define flow channels for receiving fluid flow through said reactor;
 said monolith having an outer annular surface forming an outer annular diameter and an inner annular surface forming an inner annular diameter, said inner annular surface defining a center section of said reactor;
 an inner tube adjacent said inner annular surface of said monolith;
 a cone washer adjacent said inner tube, wherein said cone washer forms an elbow joint with said inner tube; and
 said elbow joint being located at a position selected from the group consisting of: greater than 50 percent of said monolith length from said top surface of said monolith for a down flow system or greater than 60 percent of said monolith length from said bottom surface of said monolith for an up flow system.

17. The reactor of claim 16, further comprising a center support extending longitudinally through said center section of said reactor, wherein said cone washer is attached to said center support.

18. The reactor of claim 16, said center support being a link piece.

19. The reactor of claim 16, further comprising a floating ring plate attached to the bottom of said center support.

20. A reactor comprising:
 a monolith comprising a plurality of fins in an annular arrangement wherein said fins define flow channels for receiving fluid flow through said reactor, said monolith being expandable in a radial direction;
 said monolith having an outer annular surface forming an outer annular diameter and an inner annular surface forming an inner annular diameter, said inner annular surface defining a center section of said reactor;
 an expandable corrugated inner tube adjacent said inner annular surface of said monolith;
 an expandable corrugated cone washer adjacent said inner tube, wherein said inner tube and said cone washer form a substantially leak proof boundary between said monolith and said center section of said reactor; and
 said boundary forcing substantially all fluid flow through said reactor through said monolith and away from said center section of said reactor.

21. The reactor of claim 20, further comprising a center support extending longitudinally through said center section of said reactor, wherein said center support is attached to said cone washer.

* * * * *